US008481158B2

(12) United States Patent
Nakayama et al.

(10) Patent No.: US 8,481,158 B2
(45) Date of Patent: Jul. 9, 2013

(54) CARBON-BASED FINE STRUCTURE ARRAY, AGGREGATE OF CARBON-BASED FINE STRUCTURES, USE THEREOF AND METHOD FOR PREPARATION THEREOF

(75) Inventors: Yoshikazu Nakayama, Hirakata (JP); Toshikazu Nosaka, Izumi (JP); Osamu Suekane, Sakai (JP); Takeshi Nagasaka, Tokyo (JP); Toshiki Goto, Osaka (JP); Hiroyuki Tsuchiya, Kyoto (JP); Keisuke Shiono, Osaka (JP)

(73) Assignees: Technology Research Institute of Osaka Prefecture, Osaka (JP); Taiyo Nippon Sanso Corporation, Tokyo (JP); Otsuka Chemical Co., Ltd., Osaka (JP); Nissin Electric Co., Ltd., Kyoto (JP); Public University Corporation, Osaka Prefecture University, Osaka (JP)

( * ) Notice: Subject to any disclaimer, the term of this patent is extended or adjusted under 35 U.S.C. 154(b) by 1001 days.

(21) Appl. No.: 11/578,782

(22) PCT Filed: Apr. 19, 2005

(86) PCT No.: PCT/JP2005/007480
§ 371 (c)(1),
(2), (4) Date: Jul. 25, 2007

(87) PCT Pub. No.: WO2005/102924
PCT Pub. Date: Nov. 3, 2005

(65) Prior Publication Data
US 2008/0095694 A1     Apr. 24, 2008

(30) Foreign Application Priority Data

Apr. 19, 2004   (JP) ................................ 2004-123476

(51) Int. Cl.
*D01F 9/12*       (2006.01)
(52) U.S. Cl.
USPC .......................... 428/367; 423/447.2; 428/368
(58) Field of Classification Search
USPC ................................ 423/447.2; 428/367, 368
See application file for complete search history.

(56) References Cited

U.S. PATENT DOCUMENTS

| 6,239,547 B1 | 5/2001 | Uemura |
| 6,784,779 B2 | 8/2004 | Shin |
| 2003/0203139 A1 | 10/2003 | Ren et al. |
| 2004/0053780 A1 | 3/2004 | Jiang et al. |
| 2005/0081983 A1 | 4/2005 | Nakayama et al. |

FOREIGN PATENT DOCUMENTS

| EP | 0905737 | 3/1999 |
| JP | 07-138838 | 5/1995 |
| JP | 11-111158 | 4/1999 |
| JP | 2000-57934 A | 2/2000 |
| JP | 2001-115348 A | 4/2001 |
| JP | 2002-134325 | 5/2002 |
| JP | 2002-518280 A | 6/2002 |
| JP | 2003-246613 | 9/2003 |
| JP | 2003-277030 A | 10/2003 |
| JP | 2003-300716 | 10/2003 |
| JP | 2004-18328 | 1/2004 |
| JP | 2004-30926 | 1/2004 |
| TW | 200407259 | 5/2004 |
| WO | WO 03/073440 A1 | 9/2003 |

OTHER PUBLICATIONS

Pan et al. Very Long Carbon Nanotubes' in Nature vol. 394 pp. 631-632 Aug. 13, 1998.*
Taiwanese Office Action dated Jun. 13, 2007 with English translation.
Office Action dated Dec. 8, 2009 in corresponding Japanese Application No. 2006-512552.
Osaume Suekane et al. "Growth and Evaluation of Vertically Aligned Carbon Nanotubes," Extended Abstracts (The 51$^{st}$ Spring Meeting, 2004); The Japan Society of Applied Physics and Related Societies No. 1, p. 544.
C. Liu et al. "Synthesis of Macroscopically Long Ropes of Well-Aligned Single-Walled Carbon Nanotubes," Advanced Materials 12, No. 16, Aug. 16, 2000, p. 1190-1192.
Anyuan Cao et al. "Assembly of mm-scale macrobridges with carbon nanotube bundles," Applied Physics Letters, vol. 83, No. 2, Jul. 14, 2003, p. 356-358.
Kaili Jiang et al., "Spinning Continuous Carbon Nanotube Yarns" Nature 2002, vol. 419, p. 801.
H.W. Zhu et al., "Direct Synthesis of Long Single-Walled Carbon Nanotube Stands" Science 2002, vol. 296, p. 884-886.
Extended Abstracts (The 51$^{st}$ Spring Meeting, 2004); The Japan Society of Applied Physics and Related Societies, 2004, No. 1, p. 544.
X.Y. Zhang et al., "Template Synthesis of High-Density Carbon Nanotube Arrays" Journal of Crystal Growth 2001, vol. 223, p. 306-310.
Osamu Suekane et al., "Rapid Growth of Vertically Aligned Multiwall Carbon Nanotubes by Thermal Chemical Vapor Deposition", Oyo Buturi 2004, vol. 73, No. 5, p. 615-619.
Notice of Grant of Patent (with translation) in corresponding Korean Application No. 10-200607023978.
Chinese Office Action dated Jul. 9, 2010 in corresponding Chinese Application No. 200580011586.0 (with English translation).
Li et al., "Large-scale preparation of aligned carbon nanotubes arrays," Micronanoelectronic Technology, Jul.-Aug. 2003, pp. 543-545 (with English-language abstract).
European Search Report dated Mar. 12, 2012 in corresponding European Application 05734218.0.
Shoushan Fan, et al., "Self-Oriented Regular Arrays of Carbon Nanotubes and Their Field Emission Properties," Science, vol. 283, pp. 512-514 (Jan. 22, 1999).

* cited by examiner

*Primary Examiner* — Stuart Hendrickson
(74) *Attorney, Agent, or Firm* — Harness, Dickey & Pierce, P.L.C.

(57) ABSTRACT

An aggregate of carbon-based fine structures in which a plurality of carbon-based fine structures are collected, wherein respective carbon-based fine structures are oriented in the same direction. The above aggregate of carbon-based fine structures is an aggregate of a plurality of carbon-based fine structures in a state they are pulled by one another with strong interaction, and has such a length that allows the improvement of the handleability and workability thereof.

22 Claims, 15 Drawing Sheets

F I G. 1 (a)
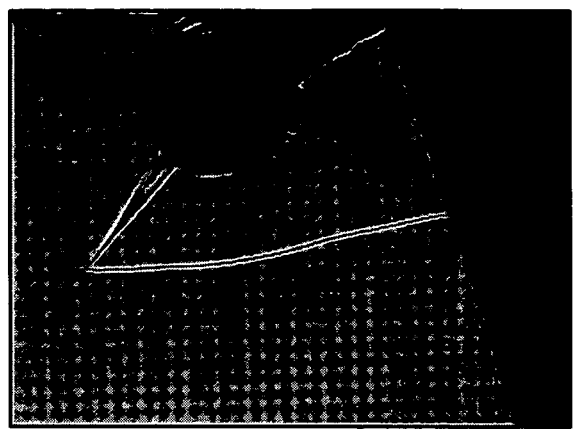
F I G. 1 (b)
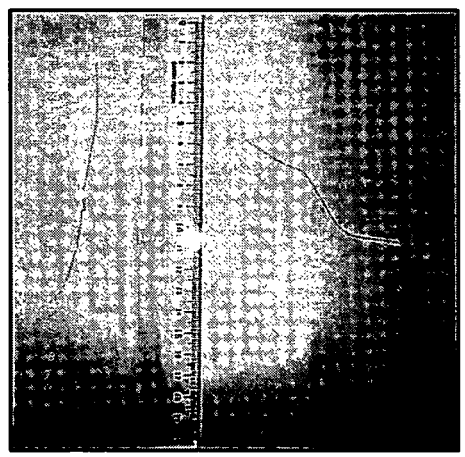

F I G. 5
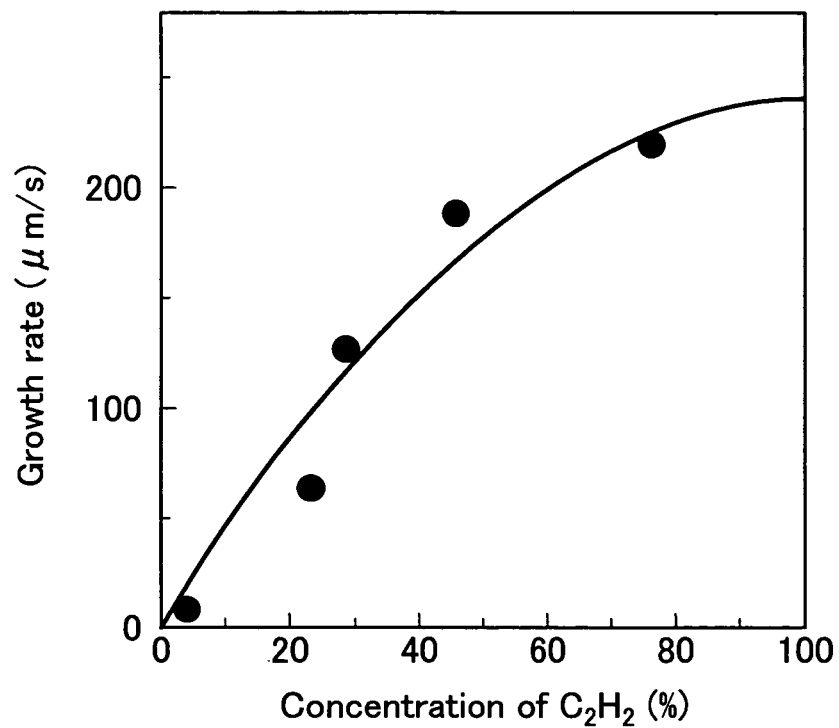

FIG. 7 (a)
FIG. 7 (b)
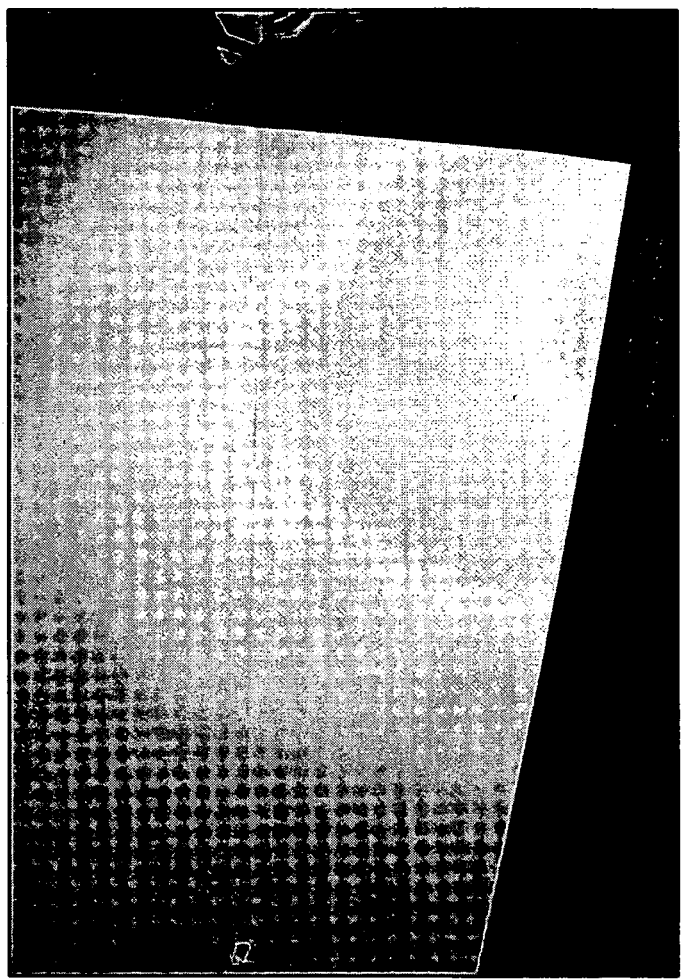
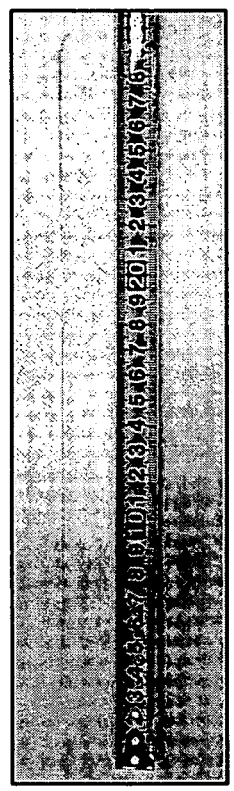

1.00mm 50.0 μm

100 μm

500nm

1cm

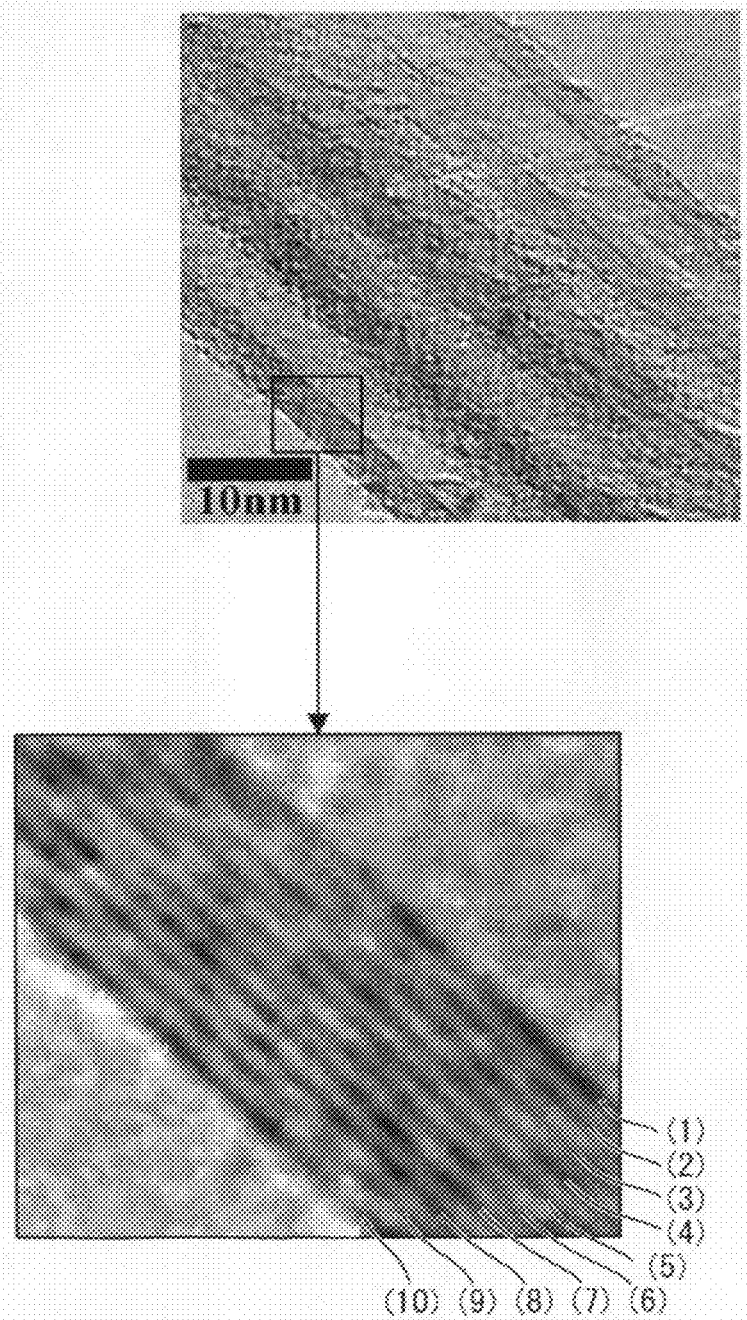

F I G. 1 8
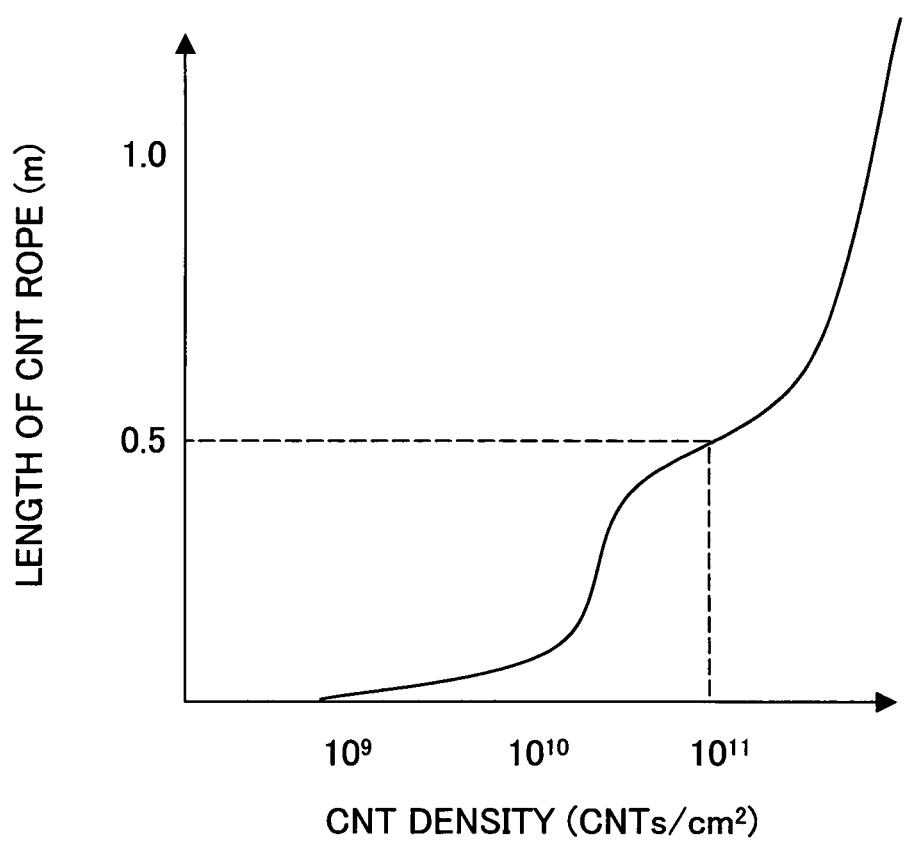

CARBON-BASED FINE STRUCTURE ARRAY, AGGREGATE OF CARBON-BASED FINE STRUCTURES, USE THEREOF AND METHOD FOR PREPARATION THEREOF

TECHNICAL FIELD

The present invention relates to a carbon-based microstructure array, an aggregate of carbon-based microstructures, use thereof, and a fabrication method thereof. More specifically, the invention relates to an array of carbon-based microstructures, for example, such as carbon nanotubes, and an aggregate of carbon-based microstructures that are held together by strong interactions such as van der Waals forces. The invention also relates to various uses of such array and aggregate of carbon-based microstructures, and a fabrication method thereof.

BACKGROUND ART

Carbon nanotubes (hereinafter, "CNTs"), one type of carbon-based micro structure, are carbon material that take the form of a pipe, with a diameter ranging from about 0.5 nm to about 10 nm, and a length of about 1 um. CNTs were first discovered as a new carbon material by S. Iijima of NEC in 1991. There are two types of CNTs: single-walled nanotubes of a single-layer structure, and multi-walled tubes of a multi-layer structure.

However, due to the microstructure, CNTs are difficult to handle and process. As such, there have been attempts to fabricate CNTs of a size large enough to be handled under naked eye (see Non-Patent Publications 1 and 2, for example).

Non-Patent Publications 1 and 2 report CNTs that are longer than conventional CNTs of about 1 μm. The CNTs taught in Non-Patent Publication 1 is about 10 cm to about 20 cm long, and the CNTs taught in Non-Patent Publication 2 is about 25 cm to about 30 cm long. These CNTs can therefore be observed by naked eye.

CNTs exhibit metal-like properties or semiconductor-like properties depending on their compositions. There accordingly has been active development of products or fabrication methods that take advantage of such properties of CNTs. Potential use of CNTs as a hydrogen absorbing material, as well as applications of CNTs to fuel cell, have also been studied.

As an example of material applications of CNTs, a woven fabric or a sheet has been proposed that uses CNTs (see Patent Publication 1, for example). Patent Document 1 describes using CNTs as part of a fiber or a yarn, or a fiber or a yarn itself, and using such fiber or yarn for a woven fabric or a sheet.

(Patent Publication 1) Japanese Laid-Open Patent Publication No. 138838/1995 (published on May 30, 1995)

(Non-Patent Publication 1) H. W. Zhu, and 5 others, "Direct Synthesis of Long Single-Walled Carbon Nanotube Strands", Science, May 3, 2002, Vol. 296, p. 884-886

(Non-Patent Publication 2) Kaili Jiang, and 2 others, "Spinning continuous carbon nanotube yarns", Nature, Oct. 24, 2002, Vol. 419, p. 801

The CNTs described in Non-Patent Publication 1 are about 10 cm to 20 cm long. However, the CNTs disclosed in this publication cannot be formed easily.

The CNTs described in Non-Patent Publication 2 are fabricated from CNTs that take the form of a brush. Specifically, a plurality of CNTs are formed on a substrate by being aligned in a direction perpendicular to the substrate. The CNTs are then detached from the substrate in bundles and pulled away.

In such aggregate of CNTs, neighboring CNTs are entangled as a CNT is pulled out from the brush-like CNTs. The brush-like CNTs are therefore required to be made out of CNTs that are sufficiently long and are formed in high density.

However, in a conventional fabrication method of brush-like CNTs, the CNTs can be grown on the substrate only slowly and brush-like CNTs with long aligned CNTs cannot be obtained. Further, due to the slow growth rate of CNTs, the conventional method is disadvantageous in terms of productivity.

Another drawback of the conventional method is that the CNTs cannot be formed in high density. The brush-like CNTs therefore fail to provide enough interactions for entangling neighboring CNTs together. It is therefore difficult to obtain rope-like CNTs.

The present invention was made in view of the foregoing problems, and an object of the present invention is to provide an array of carbon-based microstructures, and an aggregate of carbon-based microstructures that are held together by strong interactions and are long enough to improve ease of handling and workability. The invention also provides various uses and a fabrication method of such array and aggregate of carbon-based microstructures.

DISCLOSURE OF INVENTION

The inventors of the present invention diligently worked to solve the foregoing problems, and found that CNTs that are held together by strong interactions could be obtained by constructing brush-like CNTs from long CNTs that are forested in high density. The present invention was made based on this finding.

Specifically, according to the present invention, there is provided an aggregate of carbon-based microstructures, which includes a plurality of carbon-based microstructures that are assembled together, wherein the carbon-based microstructures are aligned in one direction, and are assembled together along the direction of alignment.

The aggregate of carbon-based microstructures is an assembly of carbon-based microstructures and is therefore very strong. Further, since the carbon-based microstructures are aligned in one direction, the aggregate has superior alignment. As used herein, "aligned in one direction" refers to the alignment of all carbon-based microstructures held together with their lengthwise directions pointing the same direction. The carbon-based microstructures are not always linear but are often curved slightly. As such, the "lengthwise direction" refers to a direction from one end to the other end of the carbon-based microstructure, i.e., the direction of extension of the carbon-based microstructures.

Further, since the carbon-based microstructures are assembled together along the direction of alignment, the carbon-based microstructures can be made longer. In this way, the size of the aggregate can be increased to the extent where the aggregate can be observed by naked eye, and as a result ease of handling and workability can be improved.

As described above, an aggregate of carbon-based microstructures according to the present invention is structured such that a plurality of carbon-based microstructures are aligned in one direction and are assembled together along the direction of alignment. This improves the alignment and strength of the aggregate.

According to the present invention, there is provided an array of carbon-based microstructures, which includes carbon-based microstructures that are provided on a substrate by being aligned substantially perpendicular to the substrate, wherein the carbon-based microstructures are provided on the substrate at a density of no less than $1\times10^{11}/cm^2$.

An array of carbon-based microstructures is made up of a plurality of carbon-based microstructures formed on a substrate, and the carbon-based microstructures are aligned in a direction substantially perpendicular to the substrate. This enables the carbon-based microstructures to be densely packed together to form an array.

In an array of carbon-based microstructures, the carbon-based microstructures are provided on the substrate at a density of no less than $1\times10^{11}/cm^2$. In other words, an array of carbon-based microstructures includes carbon-based microstructures that are very densely packed together. As used herein, "substantially perpendicular" to the substrate means almost perpendicular to the substrate. The meaning of "substantially perpendicular" includes a direction completely perpendicular to the substrate, as well as directions away from the substrate.

According to the present invention, there is provided a fabrication method of an aggregate of carbon-based microstructures, the method including the steps of: forming a plurality of carbon-based microstructures on a substrate with a direction of alignment perpendicular to the substrate; and pulling at least one of the carbon-based microstructures.

According to this arrangement, a plurality of carbon-based microstructures are formed perpendicular to the substrate, and at least one of the carbon-based microstructures is pulled out. Since the carbon-based microstructure is pulled out from ones that are aligned in one direction, unidirectional alignment can be realized. Further, since neighboring carbon-based microstructures are drawn out together in a bundle, the alignment and ease of bundling of the aggregate can be improved. As a result, a long and strong aggregate can be realized.

As described above, in a fabrication method of carbon-based microstructures according to the present invention, a plurality of carbon-based microstructures are formed and at least one of the carbon-based microstructures is pulled out. This improves the alignment, ease of bundling, and strength of the aggregate, and the length of the aggregate can be increased as well.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1(a) is a photograph (image) showing a CNT rope, according to one embodiment of the present invention.

FIG. 1(b) is a photograph (image) showing a CNT rope, according to one embodiment of the present invention.

FIG. 5 is a graph representing a correlation between source gas concentration and growth rate, according to one embodiment of the present invention.

FIG. 7(a) is a photograph (image) showing a CNT rope, according to one embodiment of the present invention.

FIG. 7(b) is a photograph (image) showing a CNT rope, according to one embodiment of the present invention.

FIG. 16(b) is a photograph (image) showing a transmission electron microscope (TEM) image of brush-like CNTs, according to one embodiment of the present invention.

FIG. 18 is a graph representing a relationship between CNT density of the brush-like CNTs and length of the CNT rope.

BEST MODE FOR CARRYING OUT THE INVENTION

Figure 2:
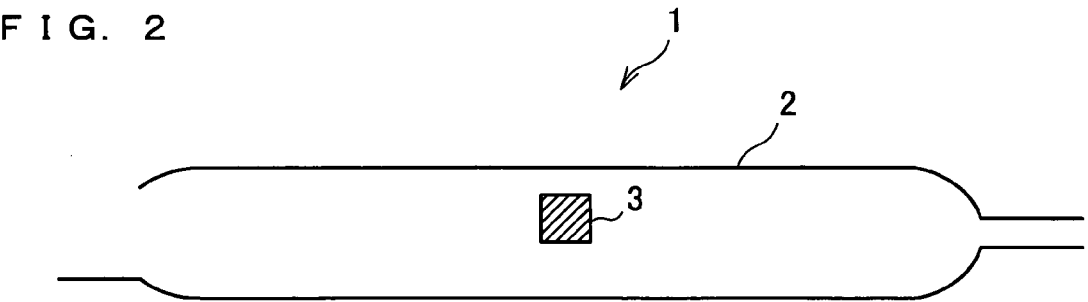
FIG. 2 is a cross sectional view schematically showing a device used to fabricate brush-like CNTs, according to one embodiment of the present invention.

The following will describe one embodiment of the present invention. It should be appreciated that the present invention is not limited in any way by the following description.

The present invention is an aggregate of carbon-based microstructures (hereinafter referred to as an "aggregate"), which are aligned in one direction and are assembled together along the direction of alignment. The meaning of an aggregate according to the present invention also includes carbon-based microstructures that are assembled together orthogonal to the direction of alignment. In order to fabricate an aggregate according to the present invention, a multiplicity of carbon-based microstructures is formed on a substrate by being aligned in a direction substantially perpendicular to the substrate, and at least one of the carbon-based microstructures is pulled out. The following describes this in detail.

[Carbon-Based Microstructures]

Carbon-based microstructures are nanoscale structures composed of carbon atoms, with a network of carbon atoms building a backbone structure. More specifically, carbon-based microstructures have a three-dimensional bonding structure similar to that of graphite. Preferably, the three-dimensional structure is a cylinder.

Carbon nanotubes (hereinafter simply "CNTs") are one specific example of such carbon-based microstructures. Other examples of carbon-based microstructures include CNTs with beads, a carbon nano-twist with twisted CNTs, a carbon nano-coil, and fullerenes with a spherical shell structure. As used herein, the term "an array of carbon-based microstructures" may be used to refer to brush-like CNTs, in which large numbers of carbon-based microstructures, CNTs, are forested together.

An aggregate according to the present invention is fabricated with brush-like CNTs, as will be described later. As such, the following description will be given through the case where carbon-based microstructures are CNTs, and an array of carbon-based microstructures is made up of brush-like CNTs, for example.

[An Array of Carbon-Based Microstructures]

Brush-like CNTs include a plurality of CNTs that are forested on a substrate and are aligned in a direction substantially perpendicular to the substrate. The substrate may be made from a Si wafer with a Fe thin film formed thereon as a catalyst. As used herein, "substantially perpendicular" to the substrate means almost perpendicular to the substrate, though it is preferably perfectly perpendicular. The meaning of "substantially perpendicular" also includes directions away from the substrate.

Brush-like CNTs according to the present invention are preferably made out of CNTs that extend a certain distance in length (height) and are densely formed on the substrate. With the CNTs of a certain length formed on the substrate, a long aggregate can be formed in the fabrication process. Specifically, the brush-like CNTs are preferably made out of CNTs that extend at least several micrometers in length.

Further, with the CNTs densely formed together, neighboring CNTs can be held together with strong interactions, for example, by van der Waals forces. For example, the brush-like CNTs are preferably made out of 10 or more CNTs that are formed in each 1 μm² area of the substrate. In other words, the CNTs are preferably formed at a density of at least 10 CNTs/μm² ($1 \times 10^9$ CNTs/cm²).

As described above, an aggregate according to the present invention is formed from brush-like CNTs. Though detailed explanations will follow, the length of the aggregate can be increased by increasing the density of the CNTs in the brush-like CNTs. It is therefore preferable that the CNTs in the brush-like CNTs be formed at a density of at least $1 \times 10^{10}$ CNTs/cm², or particularly preferably at least $1 \times 10^{11}$ CNTs/cm².

Further, it is preferable that the brush-like CNTs be made out of CNTs that have good crystallinity. The CNTs can have a more linear structure as the level of crystallinity is improved. By improving linearity of the CNTs, the aggregate can be formed more easily. That is, it is ideal that the CNTs be linear in shape, and any defect in the crystalline structure of the CNTs should be avoided since it causes a bend in the CNTs.

As used herein, "defects" are irregular portions in an ordered crystal arrangement of CNTs. The CNTs are made up of (flat hexagonal) graphene sheets of six-membered rings of carbon atoms. Defects occur if non six-membered rings, for example, such as five-membered rings or seven-membered rings, occur in portions of such orderly arranged crystal array.

The CNTs assume a linear structure when the six-membered rings are arranged in an orderly fashion. However, if five- or seven-membered rings are present in portions of the array, crystallinity suffers and the CNTs are bent in these (defect) portions. Thus, the linearity of the CNTs can be desirably improved by reducing defects. As used herein, CNTs with a few defects refer to CNTs that include no more than 10 defects in a portion 1 μm long, for example.

Crystallinity also suffers when the crystal array of CNTs contains amorphous carbon, or when layers of amorphous carbon are formed around the CNTs. Thus, CNTs with a smaller number of amorphous carbon atoms have better crystallinity.

Figure 15:
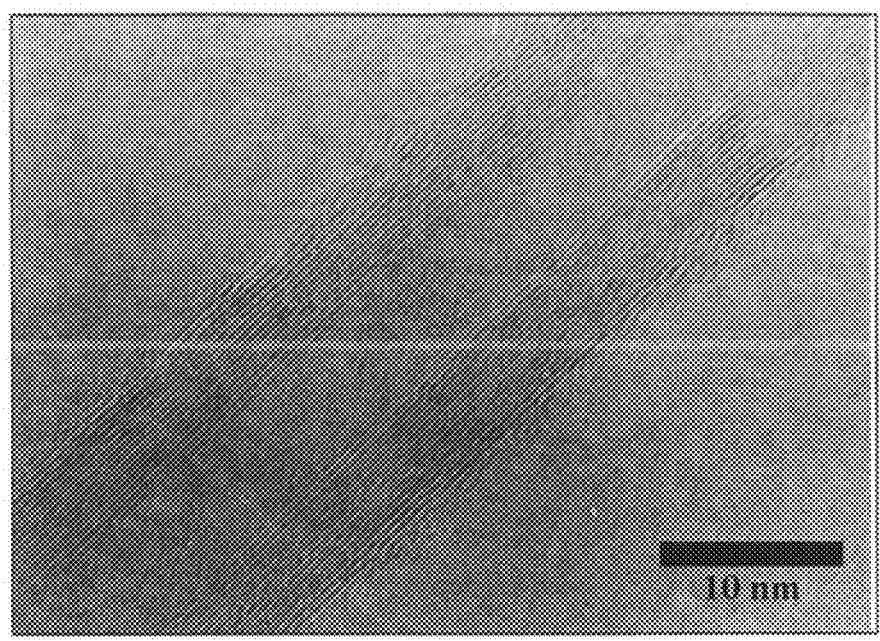
FIG. 15(a) is photograph (image) showing a transmission electron microscope (TEM) image of brush-like CNTs, according to one embodiment of the present invention.
FIG. 15(b) is a photograph (image) showing a transmission electron microscope (TEM) image of conventional brush-like CNTs.
Figure 15:
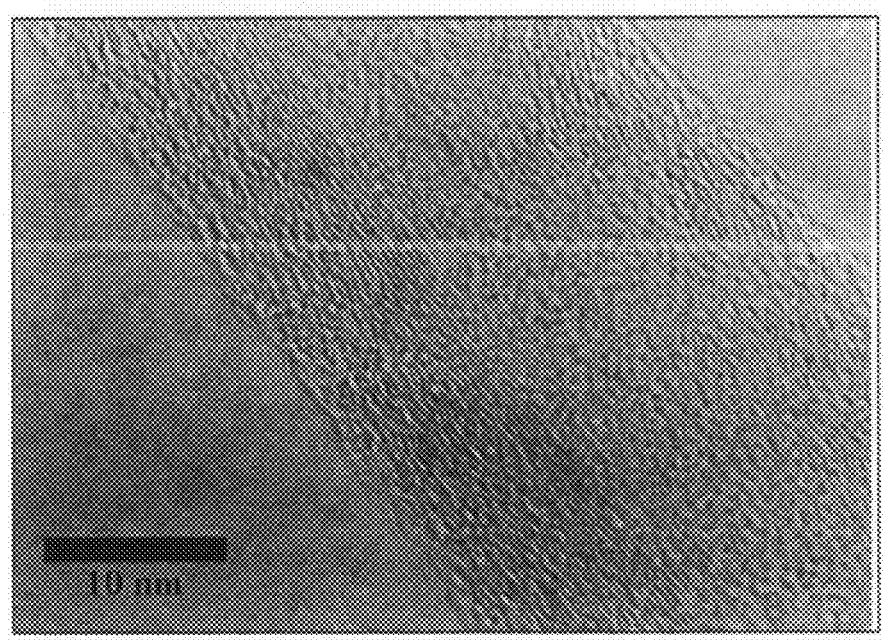

FIG. 15(a) shows a TEM image of CNTs according to the present invention, and FIG. 15(b) shows a TEM image of conventional CNTs. As can be seen in FIGS. 15(a) and 15(b), the number of amorphous carbon atoms that occur around the CNTs are considerably smaller in the CNTs according to the present invention than in the conventional CNTs. This accounts for the poor linearity of the conventional CNTs with irregularly curved graphene sheets. On the other hand, the CNTs according to the present invention have a structure with orderly layered graphene sheets, providing excellent crystallinity.

The thickness of the amorphous carbon layer formed around the CNTs is preferably no greater than 10% of the diameter of the CNTs. This further improves linearity of the CNTs.

As described above, CNTs with high crystallinity have high linearity. The high linearity improves the interactions between the CNTs. With the brush-like CNTs including CNTs with high crystallinity, a strong aggregate can easily be produced. CNTs with superior crystallinity and linearity can be produced by a fabrication method according to the present invention, as will be described later.

Preferably, the CNTs include graphene sheets in a range of 2 to 20 layers, inclusive. By increasing the number of graphene sheet layers, the strength of the aggregate formed in a subsequent step can be increased. However, if the number of graphene sheet layers exceeds 20, the aggregate loses flexibility and may break apart when a certain amount of force is applied.

[Fabrication Method of an Array of Carbon-Based Microstructures]

Brush-like CNTs according to the present invention can be fabricated by a CCVD (catalyst chemical vapor deposition) method. CCVD is a method whereby a catalyst is placed in a reaction chamber, which is then charged with carrier gas and source gas to grow CNTs on the surface of the catalyst. The following describes how the brush-like CNTs are fabricated by growing CNTs according to the CCVD method.

FIG. 2 is a diagram schematically illustrating a device 1 used for the fabrication of the brush-like CNTs. As shown in FIG. 2, a catalyzer 3 is placed in a reaction chamber 2. The catalyzer 3 is a base material with a catalyst placed thereon. The base material may be provided in various forms, for example, such as a substrate, a multi-layered substrate, a cylinder, a polyhedron, a pellet, and a powder. As a catalyst, various types of conventional catalysts can be used, examples of which include iron, cobalt, nickel, an iron alloy, a cobalt alloy, a nickel alloy, iron oxides, cobalt oxides, nickel oxides, and combinations of these catalysts.

Figure 3:
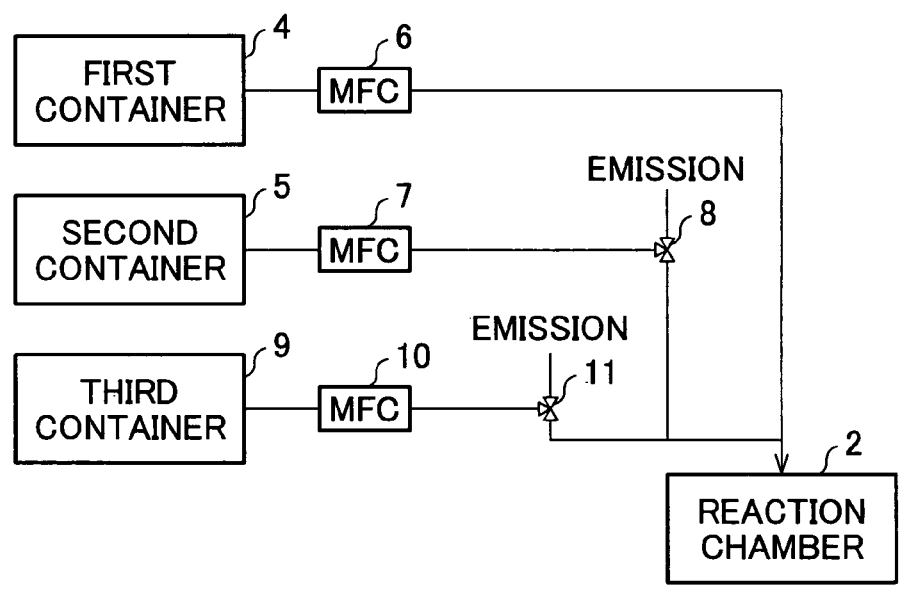
FIG. 3 is a block diagram showing steps of fabricating the brush-like CNTs, according to one embodiment of the present invention.

The reaction chamber 2 is charged with carrier gas and source gas. FIG. 3 shows how carrier gas and source gas are supplied to the reaction chamber 2 in steps. The carrier gas is stored in a first container 4 and a second container 5. The carrier gas in the first container 4 is supplied to the reaction chamber 2 after a basic flow rate has been set by a first flow-rate control unit 6 realized by a mass flow controller. The carrier gas in the second container 5 is supplied to the reaction chamber 2 via an electromagnetic three-way valve 8 after a predetermined flow rate has been set by a second flow-rate control unit 7 realized by a mass flow controller.

The carrier gas may be He, Ne, Ar, $N_2$, or $H_2$, for example. The carrier gas is used to carry the source gas, and it, unlike the source gas, does not undergo any reaction and is not consumed.

The source gas is contained in a third container 9. The source gas in the third container 9 is supplied to the reaction chamber via an electromagnetic three-way valve 11 after a predetermined flow rate has been set by a third flow-rate control unit 10 realized by a mass flow controller.

The source gas may be organic gas such as hydrocarbon gas, sulfur-containing organic gas, or phosphorus-containing organic gas. The type of source gas is suitably selected according to the structure of CNTs to be produced. Among these exemplary organic gases, hydrocarbon gas can be preferably used because it does not generate waste substances.

The hydrocarbons may be, for example, alkane compounds such as methane and ethane; alkene compounds such as ethylene and butadiene; alkyne compounds such as acetylene; aryl hydrocarbon compounds such as benzene, toluene, and styrene; aromatic hydrocarbons with a condensed ring, such as indene, naphthalene, and phenanthrene; cycloparaffin compounds such as cyclopropane and cyclohexane; cycloolefin compounds such as cyclopentene; aliphatic hydrocarbon compounds with a condensed ring, such as steroid. Further, a hydrocarbon gas with a mixture of two or more of these hydrocarbon compounds may also be used. Among these exemplary hydrocarbon compounds, particularly preferable are acetylene, allylene, ethylene, benzene, and toluene.

Under the control of an automatic valve control unit, the electromagnetic three-way valves 8 and 11 are switched between closed state and supply state. Specifically, in the closed state, the carrier gas and source gas are emitted via an auxiliary exhaust pipe. In the supply state, the carrier gas and source gas are supplied to the reaction chamber. When the electromagnetic three-way valve 8 is in the supply state, the electromagnetic three-way valve 11 is in the closed state. When the electromagnetic three-way valve 8 is in the closed state, the electromagnetic three-way valve 11 is in the supply state.

The electromagnetic three-way valves 8 and 11 have a response time that does not exceed 0.1 s. The flow rate of the carrier gas supplied to the reaction chamber 2 from the first container 4 is controlled at a basic flow rate at all times. The flow rate of the carrier gas supplied to the reaction chamber 2 from the second container 5 and the flow rate of the source gas supplied to the reaction chamber 2 from the third container 3 are controlled to always have the same flow rate. As such, the switching between closed state and supply state is made instantaneously so that the flow rates of gases supplied to the reaction chamber 2 remain constant at all times.

For example, assume that the basic flow rate of the carrier gas supplied from the first container 4 is X ($cm^3$/s (normal)), and that the flow rate of the carrier gas supplied from the second container 5 and the flow rate of the source gas supplied from the third container 9 are Y ($cm^3$/s (normal)).

Figure 4:
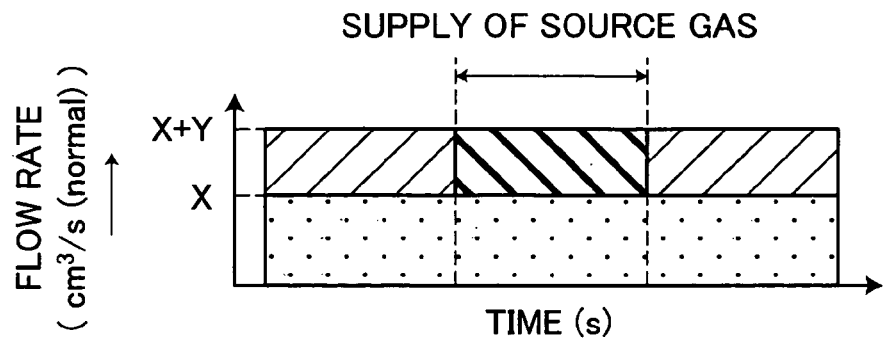
FIG. 4 is a diagram showing a relationship in the flow rates of carrier gas and source gas, according to one embodiment of the present invention.

As shown in FIG. 4, the reaction chamber 2 is always charged with the carrier gas supplied from the first container 4 ($cm^3$/s (normal)). When the brush-like CNTs are not produced, the electromagnetic three-way valve 8 is in the supply state and the electromagnetic three-way valve 11 is in the closed state. In this case, since the carrier gas from the second container 5 is supplied at flow rate Y ($cm^3$/s (normal)), the reaction chamber 2 is charged with gases at the flow rate of X+Y ($cm^3$/s (normal)).

On the other hand, when the brush-like CNTs are produced, the electromagnetic three-way valve 8 is in the closed state and the electromagnetic three-way valve 11 is in the supply state. In this case, since the source gas from the third container 9 is supplied at flow rate Y ($cm^3$/s (normal)), the reaction chamber 2 is charged with gases at the flow rate of X+Y ($cm^3$/s (normal)), as in the foregoing case. That is, the flow rates of gases supplied to the reaction chamber 2 remain constant at all times.

The reaction chamber 2 is heated to optimum temperatures for CNT growth, and the source gas undergoes pyrolysis in the vicinity of the catalyzer 3. The decomposed product of pyrolysis then grows into CNTs on the surface of the catalyzer 3.

The following specifically describes the method by which the brush-like CNTs are produced with the device 1. As the catalyzer (substrate) 3, a Si substrate with an iron catalyst film of 4 nm thick formed thereon is used. As the carrier gas and source gas, He gas and $C_2H_2$ gas are used, respectively. The basic flow rate of the He gas from the first container 4 is set to 0.93 $cm^3$/s (normal), and the flow rate of the He gas from the second container 5 and the flow rate of the $C_2H_2$ gas from the third container 9 are set to 3.11 $cm^3$/s (normal).

First, the substrate 3 is placed in a middle portion of the reaction chamber 2, which is then heated to 700° C. Here, the electromagnetic three-way valve 8 is in the supply state, and the reaction chamber 2 is charged with He gas at the flow rate of 4.04 $cm^3$/s (normal). The electromagnetic three-way valve 8 is then closed, and, at the same time, the electromagnetic three-way valve is opened. As a result, the reaction chamber 2 is charged with $C_2H_2$ gas and He gas at the flow rates of 3.11 $cm^3$/s (normal) and 0.93 $cm^3$/s (normal), respectively. Here, the $C_2H_2$ gas has a concentration of 76.9%, and is supplied for 0.8 seconds. The reaction chamber 2 is then heated for 5 minutes after the $C_2H_2$ gas has been supplied, by which time the $C_2H_2$ gas has passed the reaction chamber 2. As a result, carbon atoms in $C_2H_2$ grow on the substrate 3 and the brush-like CNTs are formed.

Referring to FIG. 5, the following describes a relationship between growth rate of CNTs and concentration of source gas in the fabrication of the brush-like CNTs. As shown in FIG. 5, the growth rate of CNTs increases with increase in concentration of the source gas. The increasing growth rate of CNTs can be explained by the rapid change in the concentration of the source gas upon reaching the substrate. By increasing the growth rate of CNTs, the work time can be reduced and the CNTs can be extended in length.

Increasing the concentration of the source gas from 23% to 76.9% increases the density of CNTs from $2 \times 10^{10}/cm^2$ to $7 \times 10^{11}/cm^2$. That is, the density of CNTs can be increased by increasing the concentration of the source gas.

It is therefore preferable that the concentration of the source gas used to fabricate the brush-like CNTs be no less than several ten percent. Specifically, the concentration of the source gas is preferably in a range of 23% to 70%, inclusive. This enables the CNTs to grow both quickly and densely.

The growth time of CNTs can be increased by extending the supply time of the source gas. In other words, by controlling the supply time of the source gas, the length of CNTs can be increased even longer. However, since there is a corresponding increase in the diameter of the CNTS in this case, the supply time of the source gas should be suitably decided taking into account the concentration of the source gas and required length and thickness of CNTs. Preferably, the supply time of the source gas is in a range of 0.001 seconds to 60 seconds.

Figure 6A:
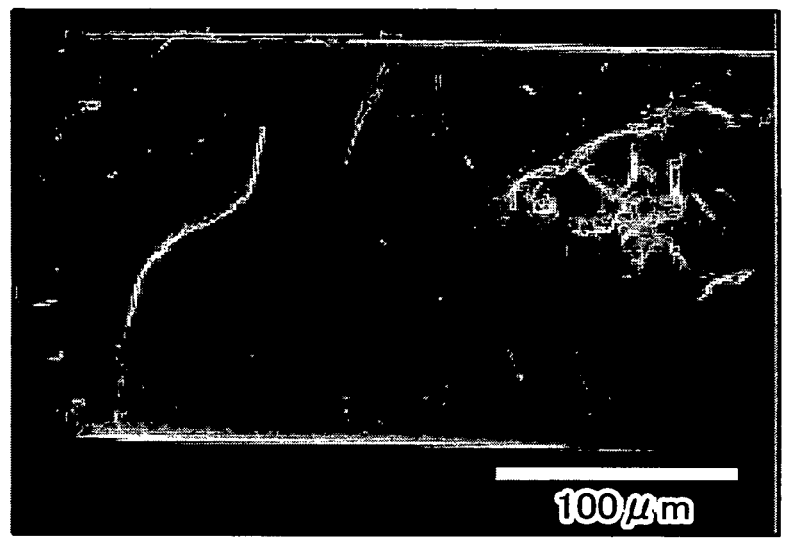
FIG. 6(a) is a photograph (image) showing a scanning electron microscope (SEM) image of brush-like CNTs, according to one embodiment of the present invention.
Figure 6B:
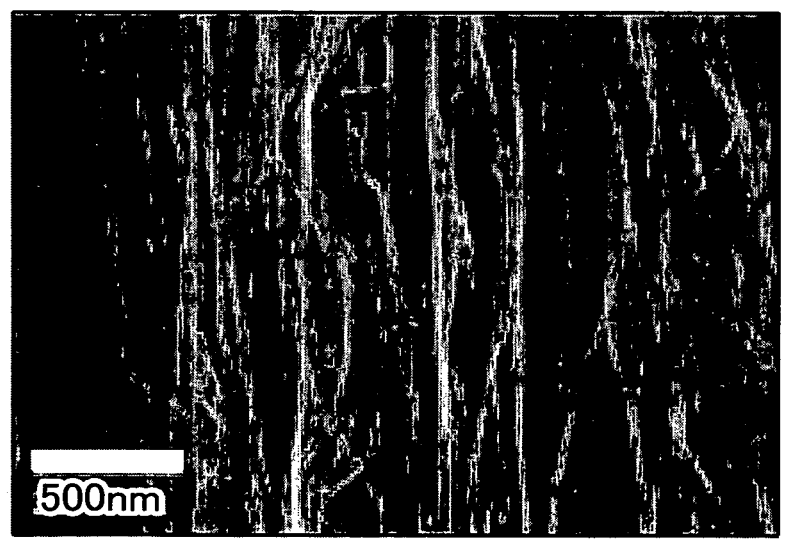
FIG. 6(b) is a photograph (image) showing a scanning electron microscope (SEM) image of brush-like CNTs, according to one embodiment of the present invention.

FIGS. 6(a) and 6(b) show scanning electron microscope (SEM) images of the brush-like CNTs. FIG. 6(b) is a magnified view of FIG. 6(a). As can be seen in FIGS. 6(a) and 6(b), the CNTs of the brush-like CNTs are highly linear and have grown to about 170 μm in length. The density of the CNTs was estimated to be at least $1 \times 10^{10}/cm^2$.

In the present embodiment, the measurement of CNT density is performed as follows based on SEM and TEM images.

First, portions of CNTs exhibiting the same contrast in the SEM image are examined as shown in FIG. 6(a) or 6(b). As used herein, "portions exhibiting the same contrast" or "the same contrast portions" refers to portions of SEM image where intensities of the CNTs are substantially uniform. Such portions are estimated to have a substantially constant CNT density.

Then, the widths of CNTs in the same contrast portions are measured. From the result of measurement, the diameters of CNTs in the same contrast portions can be estimated. Further, the number of CNTs in the same contrast portions is also measured to estimate the density of CNTs therein. It should be noted that since the CNTs that appear in the SEM image are bundles of CNTs (bundle CNTs), the estimated density in the SEM image is based on the number of bundle CNTs per unit area.

Figure 16A:
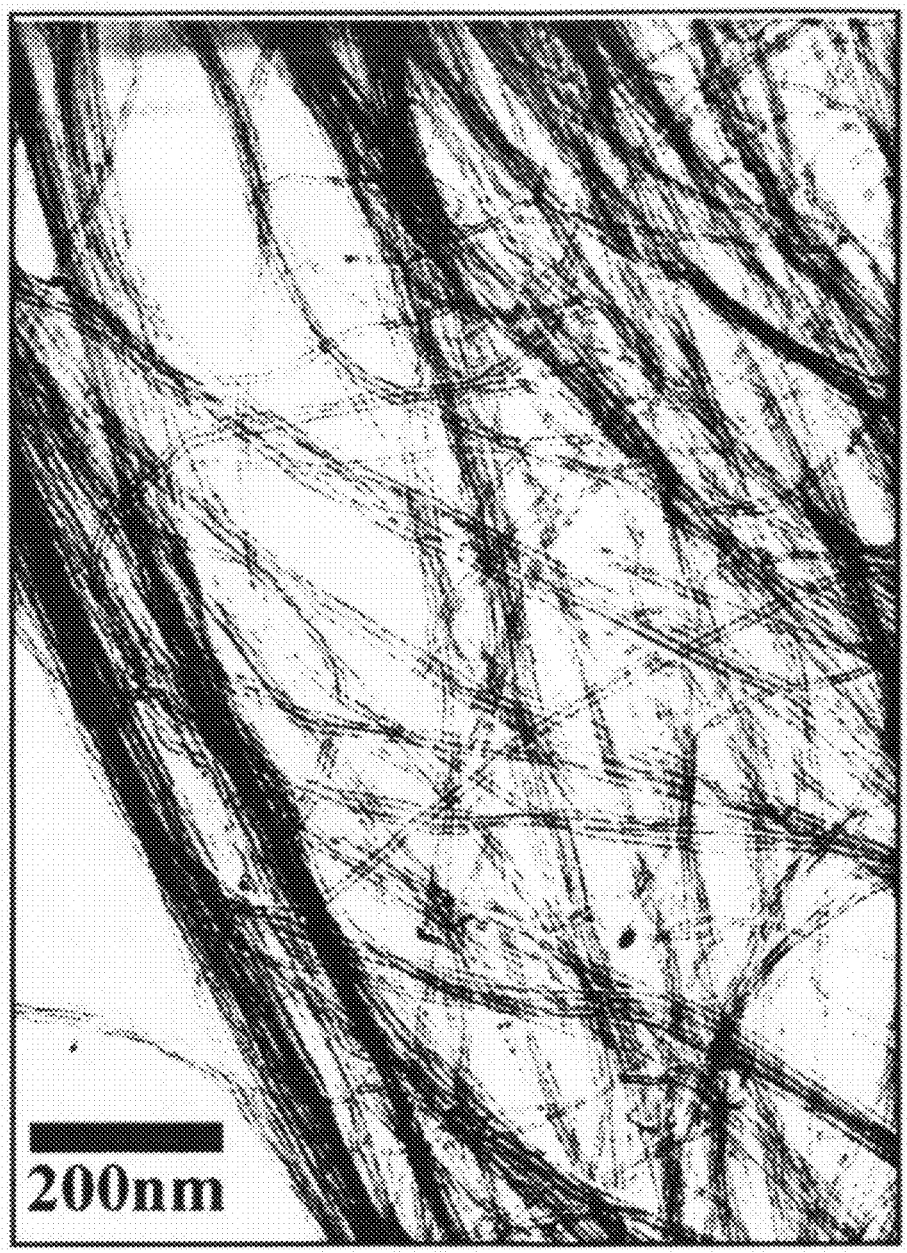
FIG. 16(a) is a photograph (image) showing a transmission electron microscope (TEM) image of brush-like CNTs, according to one embodiment of the present invention.

Then, portions of CNTs with estimated diameters and densities are observed with TEM. FIGS. 16(a) and 16(b) show TEM images of the CNTs. As can be seen in the TEM images, the bundle CNTs observed in the SEM images are indeed made up of individual CNTs. By observing the TEM images, the number of CNTs in each bundle CNT is measured in the SEM images.

Once the diameter of CNTs and the number of bundle CNTs in the same contrast portions were measured in the SEM image, the number of CNTs contained in the bundle CNTs can be measured in the TEM image to give the number of CNTs per unit area, i.e., CNT density.

A fabrication method according to the present invention enables fabrication of the CNTs with high crystallinity, as well as the brush-like CNTs made out of the CNTs with high crystallinity.

[Aggregate of Carbon-Based Microstructures]

In the following, description is made as to an aggregate of carbon-based microstructures according to the present invention. An aggregate according to the present invention is made up of CNTs that are aligned in one direction and are assembled together along the direction of alignment. As used herein, "aligned in one direction" refers to the alignment of all carbon-based microstructures that are assembled together with their lengthwise directions pointing the same direction. The carbon-based microstructures are not always linear but are often curved slightly. As such, the "lengthwise direction" refers to a direction from one end to the other end of the carbon-based microstructure, i.e., the direction of extension of the carbon-based microstructures.

An aggregate according to the present invention is made up of bundles of CNTs tangled together. As such, an aggregate according to the present invention has such a structure that the bundles of CNTs that are aligned in the same direction extend along the lengthwise direction. For convenience of explanation, such structure will be referred to as a "CNT rope."

Further, an aggregate according to the present invention also includes structures that are assembled together along a direction orthogonal to the direction of alignment. As used herein, a "direction orthogonal to the direction of alignment" is a direction that is right angle to the lengthwise direction of the CNT ropes (transverse direction). That is, the CNT ropes can be aligned along both the lengthwise direction and the transverse direction, and the aggregate can therefore have a two-dimensional spread. Such structure can be described as an aggregate with the CNT ropes that are assembled together along the sides of a two-dimensional plane. For convenience of explanation, such aggregate will be referred to as a "CNT sheet."

FIGS. 1(a) and 1(b) and FIGS. 7(a) and 7(b) show CNT ropes according to the present invention, wherein FIGS. 1(a) and 1(b) show a CNT rope about 20 cm long, and FIGS. 7(a) and 7(b) a CNT rope about 30 cm long. As clearly shown in these Figures, a CNT rope according to the present invention is a yarn-like material that can be recognized by naked eye.

Figure 8:
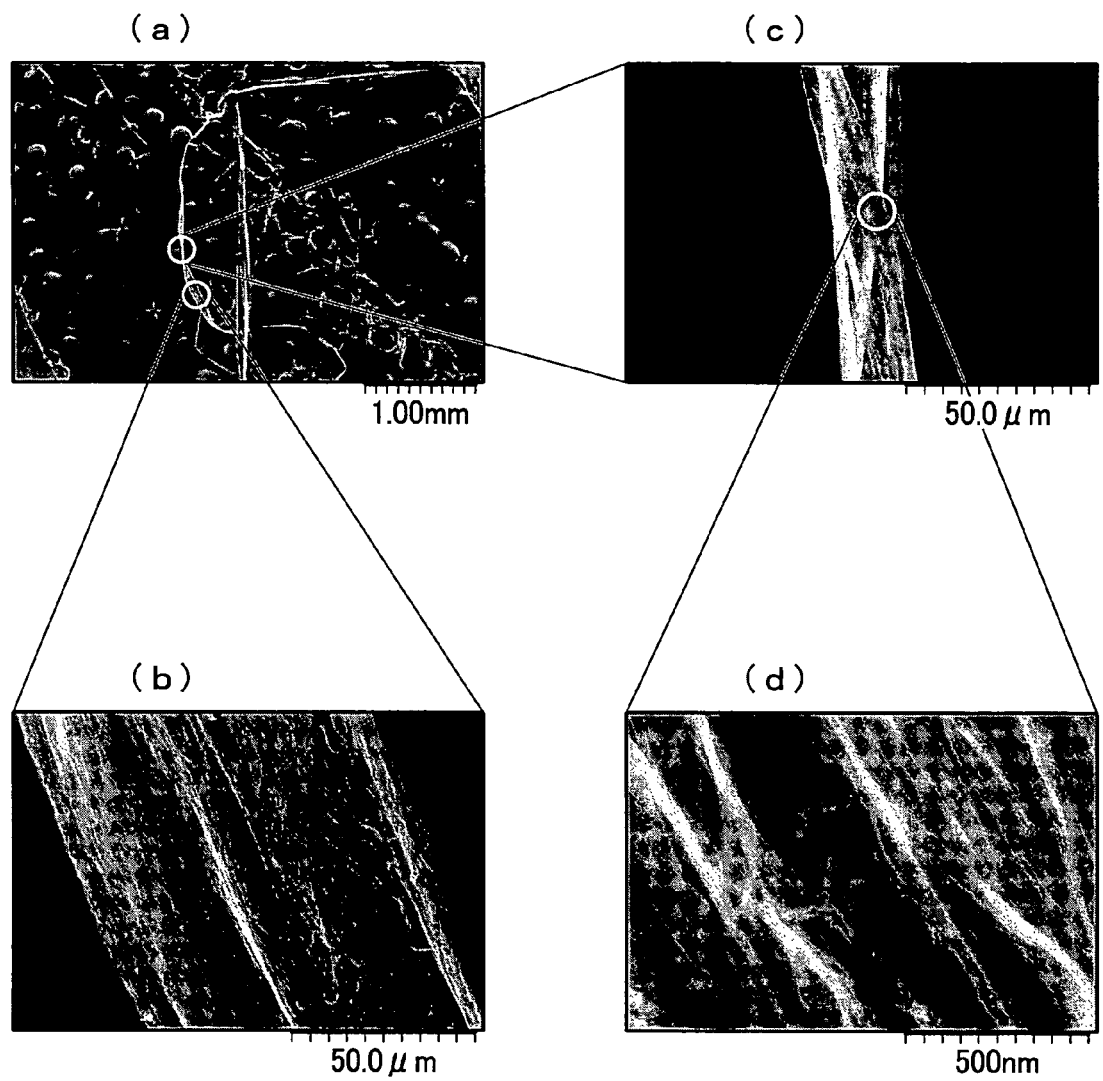
FIGS. 8(a) through 8(d) are photographs (images) showing scanning electron microscope (SEM) images of a CNT rope, according to one embodiment of the present invention.

The following describes a detailed structure of the CNT rope. FIG. 8 shows a SEM image of the CNT rope shown in FIGS. 1(a) and 1(b). FIGS. 8(b) and 8(c) are SEM images magnifying portions of the CNT rope shown in FIG. 8(a), and FIG. 8(d) is a SEM image magnifying a portion of the CNT rope shown in FIG. 8(c).

As shown in FIG. 8, the CNT rope is a bundle of CNTs. In other words, individual CNTs are bundled together to make up the CNT rope. The average diameter of the CNT rope is about 50 μm. The diameter of individual filamentous structures forming the CNT rope is about 50 nm. The diameter of individual CNT of the brush-like CNTs, as observed with a transmission electron microscope (TEM) is about 10 nm to about 20 nm. This supports the notion that the CNT rope is indeed a bundle of individual CNTs.

While the average length of individual CNTs in the brush-like CNTs is about several ten micrometers, a CNT rope according to the present invention can be made as long as 20 cm or 30 cm. By controlling the density of CNTs in the brush-like CNTs, the length of the CNT rope can be extended to 50 cm or even longer. This is possible because individual CNTs are bundled together by being aligned in the same direction along the lengthwise directions. Briefly, a CNT rope according to the present invention is a bundle of individual CNTs that are aligned in one direction.

The CNTs in the bundle are partially held together by van der Waals forces. Accordingly, the CNTs are held together by strong interactions, and as such the CNP rope is very strong. Further, the CNTs in the bundle can be held together by physical or chemical means. In this case, the strength of the CNP rope can be improved even further.

Figure 9:
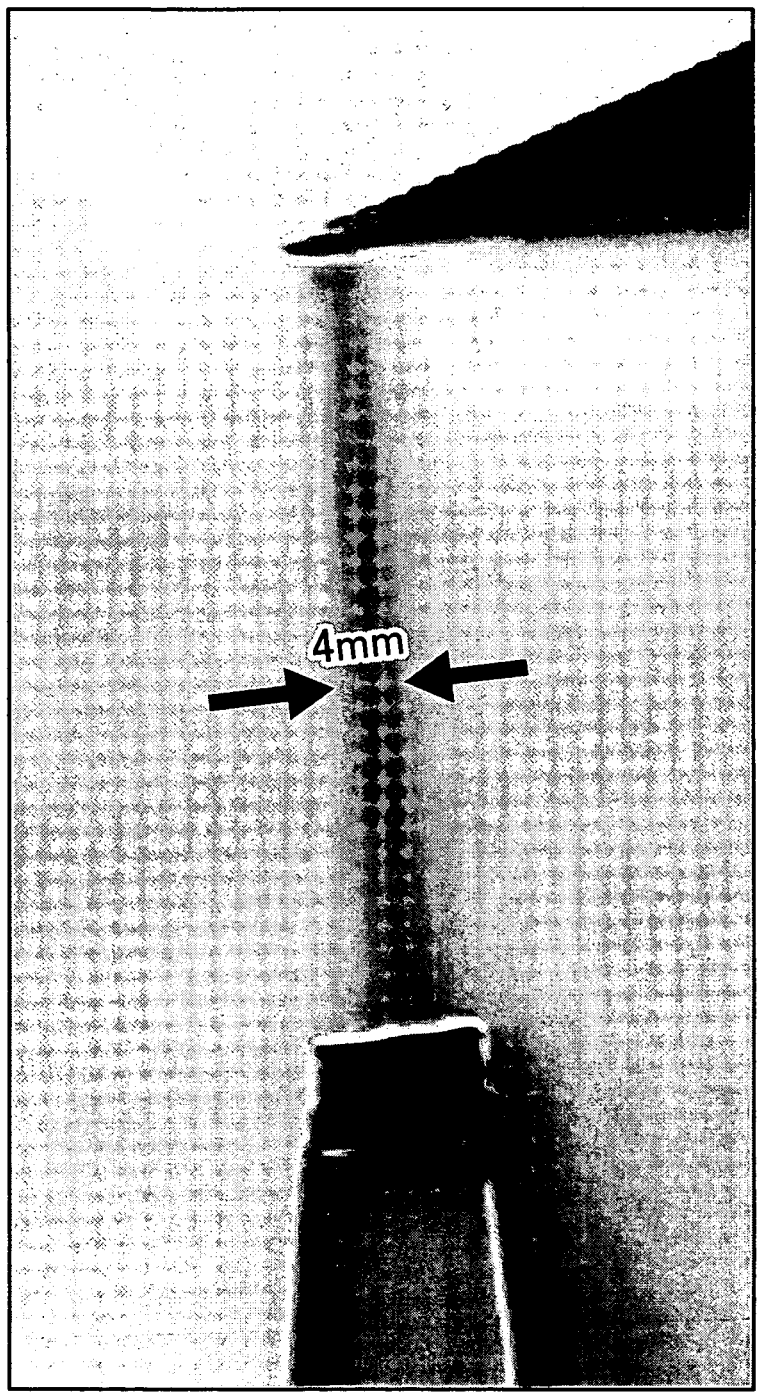
FIG. 9 is a photograph (image) showing a CNT sheet, according to one embodiment of the present invention.

The CNT sheet is a two-dimensional aggregate of the CNT ropes, i.e., a sheet of CNT ropes. As such, the CNT sheet is structured from the bundles of individual CNTs. However, in the CNT sheet, the individual CNTs that are aligned in one direction are continuously bundled together not only in the lengthwise direction but in the transverse direction as well. FIG. 9 shows a CNT sheet. As can be seen in FIG. 9, the CNT sheet is in the form of a sheet with a width of 4 mm.

A CNT rope according to the present invention is fabricated using the brush-like CNTs including highly crystalline CNTs. This renders the CNT rope very crystalline. The CNT rope is therefore highly linear. Further, with the densely formed CNTs, the brush-like CNTs can be used to produce long and strong CNT ropes.

Figure 17:
FIG. 17(a) is a photograph (image) showing how the strength of a CNT rope is measured, according to one embodiment of the present invention.
FIG. 17(b) is a photograph (image) showing how the strength of a CNT rope is measured, according to one embodiment of the present invention.
FIG. 17(c) is a photograph (image) showing how the strength of a conventional CNT rope is measured.
FIG. 17(d) is a photograph (image) showing how the strength of a conventional CNT rope is measured.
Figure 17:
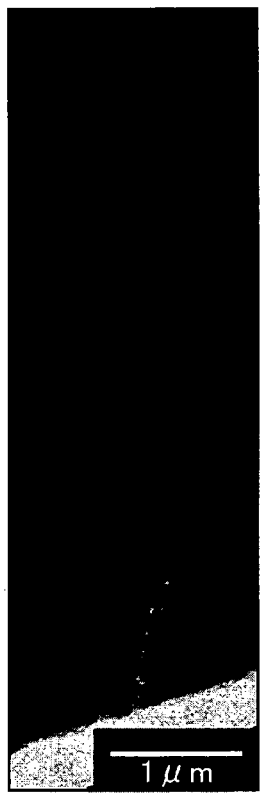
Figure 17:
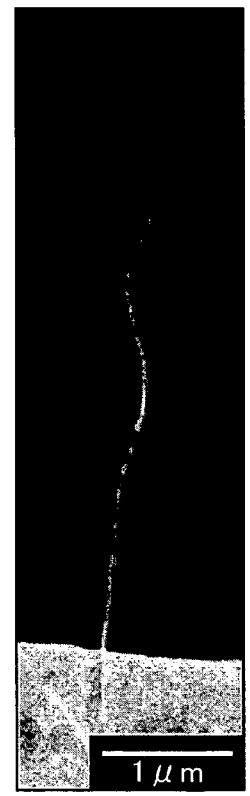
Figure 17:

In the following, description is made as to strength of a CNT rope according to the present invention. FIGS. 17(a) and 17(b) are photographs (images) measuring a strength of a CNT rope according to the present invention. FIGS. 17(c) and 17(d) are photographs (images) measuring a strength of a conventional CNT rope. In FIGS. 17(a) and 17(b) and FIGS. 17(c) and 17(d), the strength (mechanical property) of the CNT rope was measured according to a resonating method.

FIG. 17(a) shows a CNT rope of the present invention in rest. FIG. 17(b) shows the CNT rope in a resonating state. FIG. 17(c) shows a conventional CNT rope in rest. FIG. 17(d) shows the conventional CNT rope in a resonating state. As can be seen from FIG. 17(b) and FIG. 17(d), the CNT rope of the present invention resonates over a smaller range and is therefore stronger than the conventional CNT rope. In the resonating method, Young's modulus is given by the following equation:

$$Y=(64\pi^2\rho/1.875^4)\times(f_o^2L^4/d_o^2) \quad (1)$$

where $f_o$ is the oscillating frequency, $\rho$ the density, L the length, and $d_o$ the outer diameter (>>the square of inner diameter).

Calculation of Young's modulus using Equation (1) yielded the following results: Y=0.1 (TPa) for the conventional CNT rope, and Y=0.8 (TPa) for the CNT rope of the present invention. The examination of mechanical property therefore showed that the conventional CNT rope (with many defects and wide bends) has a small Young's modulus and is weak.

[Fabrication Method of an Aggregate of Carbon-Based Microstructures]

The following describes a fabrication method of a CNT rope according to the present invention. The CNT rope can be fabricated from the brush-like CNTs.

As described above, the brush-like CNTs are formed on a substrate. Fabrication of a CNT rope proceeds by dividing the substrate apart. By dividing the substrate, portions of the CNTs are exposed. At least one of the CNTs in the exposed portion is picked and pulled out with tweezers or the like. As the CNT is pulled out, neighboring CNTs are drawn out together as a continuous yarn of tangled CNTs. The CNT is pulled out in the direction it is drawn out from the substrate.

The CNTs are held together by van der Waals forces. Thus, by drawing out at least one of the CNTs, neighboring CNTs are continuously drawn out in a bundle along with it. By pulling the CNTs further, a bundle of CNTs are obtained that defines a CNT rope.

In this manner, a CNT rope with the unidirectionally aligned CNTs can be obtained simply by pulling the unidirectionally aligned brush-like CNTs and continuously drawing out CNTs. This makes it easy to control alignment of the CNTs.

Figure 10:
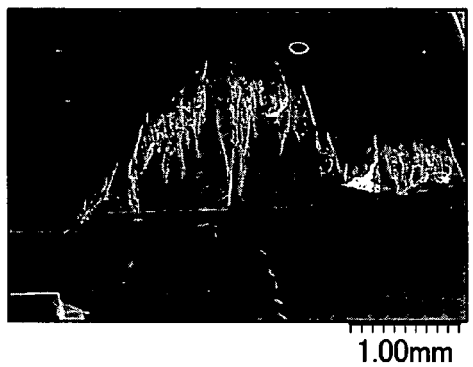
FIG. 10(a) is a photograph (image) showing a scanning electron microscope (SEM) image of brush-like CNTs, according to one embodiment of the present invention.
FIG. 10(b) is a photograph (image) showing a scanning electron microscope (SEM) image of brush-like CNTs, according to one embodiment of the present invention.
FIG. 10(c) is a photograph (image) showing a scanning electron microscope (SEM) image of a CNT rope, according to one embodiment of the present invention.
FIG. 10(d) is a photograph (image) showing a scanning electron microscope (SEM) image of a CNT rope, according to one embodiment of the present invention.
Figure 10:
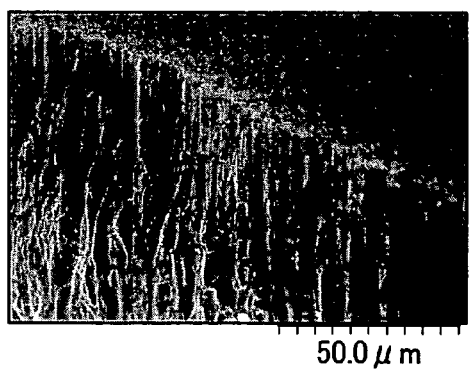
Figure 10:
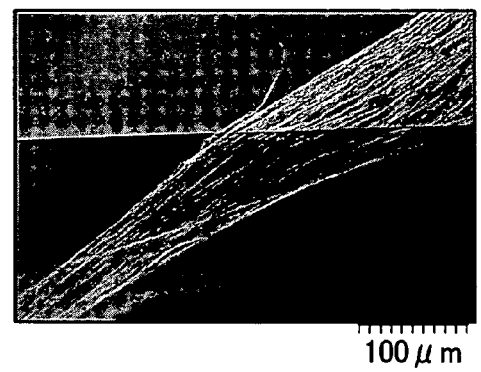
Figure 10:
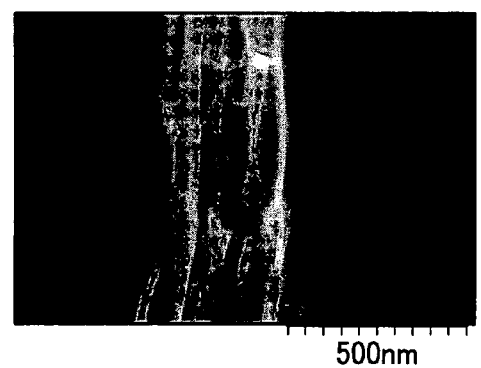
Figure 11A:
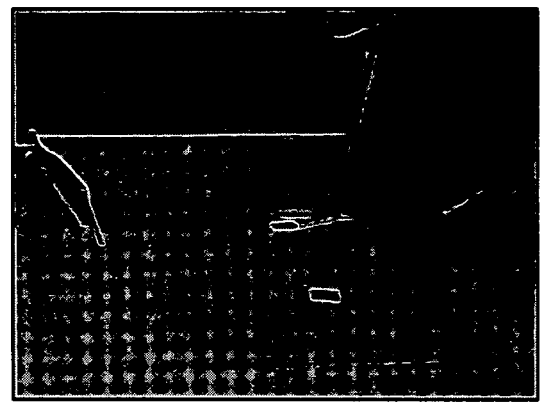
FIG. 11(a) is a photograph (image) showing how the CNT rope is lifted, according to one embodiment of the present invention.
Figure 11B:
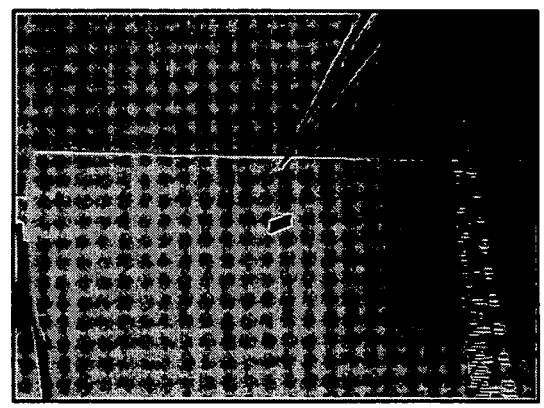
FIG. 11(b) is a photograph (image) showing how the CNT rope is lifted, according to one embodiment of the present invention.
Figure 12:
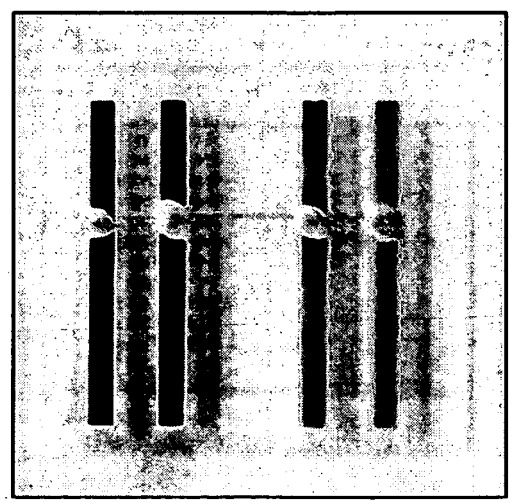
FIG. 12 is a photograph (image) showing a sample being observed to measure electrical properties.

In the fabrication of the CNT rope, the brush-like CNTs are successively stripped off from an end of the substrate—a process similar to unraveling a yarn from a sweater. FIG. 10(a) is a SEM image of the brush-like CNTs after the CNT rope has been fabricated. As shown in FIG. 10(a), the CNTs have been detached and the underlying Si substrate is exposed.

The brush-like CNTs are in the form of a sheet near the substrate surface, with the CNTs aligned parallel to the substrate, as shown in FIG. 10(b). In the fabrication of the CNT rope, the CNTs in the sheet are bundled together and form a rope. FIGS. 10(c) and 10(d) show SEM images of the CNT rope.

The CNT sheet can be fabricated by increasing the number of CNTs pulled out from the brush-like CNTs. As mentioned above, the brush-like CNTs are in the form of a sheet near the substrate surface, and therefore a CNT sheet can be fabricated simply by pulling a sheet of CNTs. A sheet size can be suitably changed by varying the number of CNTs picked to draw out the CNTs.

Alternatively, the CNT sheet can be fabricated by pulling each piece of the substrate that has been split apart. By pulling the substrates, the CNTs formed on the respective substrates attract each other to continuously unravel the CNTs. As a result, a CNT sheet is fabricated in which the CNTs are aligned in one direction.

Note that, the CNT rope or CNT sheet forms different bundles depending on the density of CNTs in the brush-like CNTs. Thus, by controlling the density of the brush-like CNTs according to the intended use of the CNT rope or CNT sheet, the CNT rope or CNT sheet can be obtained in desired bundles.

The present invention uses the brush-like CNTs with dense CNTs, enabling the length of the CNT rope or CNT sheet to be increased. The following describes a relationship between CNT density of the brush-like CNTs and length of the CNT rope. FIG. 18 is a graph representing a relationship between CNT density of the brush-like CNTs and the length of a CNT rope that can be drawn out from the brush-like CNTs.

As shown in FIG. 18, CNTs can be drawn out when the CNT density of the brush-like CNTs is about $1\times10^9/cm^2$. That is, fabrication of the CNT rope is possible. The length of the CNT rope is increased by increasing the CNT density. With a CNT density exceeding $1\times10^{10}/cm^2$, a CNT rope can be fabricated that extends about 10 cm to about 40 cm in length.

With the foregoing fabrication method, the present invention can produce brush-like CNTs with a CNT density of $1\times10^{11}/cm^2$ or greater. As shown in FIG. 18, when the CNT density is $1\times10^{11}/cm^2$ or greater, a CNT rope can be fabricated that extends 50 cm or greater in length.

That is, a fabrication method of the present invention enables fabrication of brush-like CNTs in high density and excellent crystallinity, which can then be used to fabricate a long and strong CNT rope.

The CNT rope or CNT sheet can also be fabricated by strongly binding CNTs by various methods. For example, the CNTs can be bound together by physical or chemical means. As described above, the CNTs are held together by strong interactions such as van der Waals forces. By more firmly binding the CNTs, the strength of resulting CNT ropes or sheets can be improved.

Examples of a method for physically or chemically binding CNTs include plying, high-temperature annealing, and chemical treatment. Plying is a method in which the CNTs are firmly plied together. In high-temperature annealing, CNTs are heated in various kinds of high-temperature gases. Chemical treatment refers to a method in which the CNTs are physically or chemically bound together by introducing fullerene or functional arrays.

[Use of an Aggregate of Carbon-Based Microstructures]

Owning to the foregoing structures and properties, an aggregate of carbon-based microstructures according to the present invention has many applications. For example, the aggregate can be used as a laminated matrix structure, a metal carrier, a surface modifier, a plied-yarn structure, a fabric structure, or a coiled structure. The aggregate can also be used as a reinforcing material, an electrical wire, a conducting wire, a sensor, a transparent conductor, a blade, a motor, a transparent electromagnetic wave absorber, a building material, a diaphragm, a sliding member, an artificial muscle, clothes, a fishing line, a photo-absorber, a reflector, a non-woven fabric, an artificial dielectric medium, ink, coatings, a heat-resistant material, or an abrasion-resistant material. The following specifically describes these applications.

(Laminated Matrix Structure)

A CNT rope and CNT sheet of the present invention are anisotropic. As such, by impregnating or mixing the CNT rope or sheet of the present invention with resin or other materials, a sheet-like mold product (pre-preg) with an aligned matrix can be produced.

Figure 13:
FIG. 13(a) is a diagram showing steps of fabricating a pre-preg and a laminate, according to one embodiment of the present invention.
FIG. 13(b) is a diagram showing steps of fabricating a pre-preg and a laminate, according to one embodiment of the present invention.
FIG. 13(c) is a diagram showing steps of fabricating a pre-preg and a laminate, according to one embodiment of the present invention.
Figure 13:
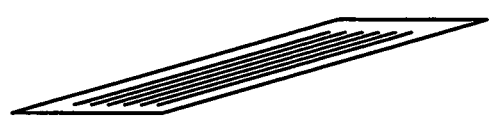
Figure 13:
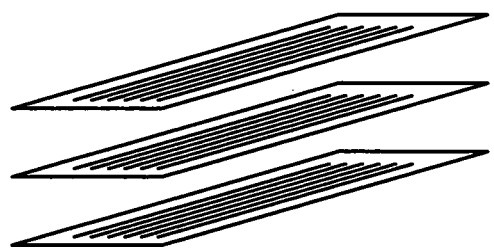

A pre-preg can be produced as follows. First, as shown in FIG. 13(a), a CNT rope or sheet is processed into a film or a sheet. Then, as shown in FIG. 13(b), the CNT rope or CNT sheet is impregnated with liquid resin or a resin solution. By curing the resin or evaporating the solvent, a pre-preg is obtained. When the CNT rope or CNT sheet is impregnated with resin, a resin sheet is obtained as a mold product.

The pre-preg is applicable to a reinforced resin sheet of carbon fiber or glass fiber. For example, the pre-preg is applicable to aerospace industry which imposes severe weight and performance requirements. Other applicable areas include auto-materials, small ships, and sports gear.

The pre-preg can be laminated to provide a laminated matrix structure, which is a laminate as shown in FIG. 13(c). In laminating the pre-pregs, any angle can be suitably set for the alignment angle of the CNTs in each sheet. By suitably varying the alignment angle in laminating the pre-pregs, many different properties can be rendered to the laminates, for example, such as structural strength, anisotropy, and good heat conductivity.

A laminate using the CNT rope or CNT sheet can be made considerably thinner than conventional pre-pregs using glass fiber or carbon fiber. With the strength, electrical conductivity, heat conductivity, or other properties, such ultra-thin film is applicable not only to the field of high-strength materials, but has potential applications, though to limited extent, in laminated boards (for example, IC, CPU) of electrical devices. Recent electrical devices have encountered the problem of heat radiation due to high integration and large capacity. It is expected that the problem of heat radiation in a laminated board can be relieved when a laminate with good heat conductivity is used as an anisotropic heat conductive film.

(Metal Carrier)

By supporting metal on the aggregate, a metal carrier with a large surface area can be provided. Owning to the fact that the CNT rope or CNT sheet is a bundle of large numbers of unidirectionally aligned thin CNTs, the CNT rope and CNT sheet have a large specific surface area (m$^2$/g). This enables a large amount of metal to be supported, and thereby enables production of materials that excel in performance, efficiency, and activity. Further, since the dimensions (diameter, length, etc.) of the tubes in the CNT rope are uniform, the metal can be supported with good dispersibility.

For example, a metal catalyst (fine particles) such as Pt, Pd, or Ni may be supported on the CNT rope. In this case, the CNT rope can be used as a catalyst material that has superior performance, efficiency, and activity, or as a gas reaction material such as a gas filter. When used as a gas filter, a pressure loss (gas resistance) can be reduced. Further, by supporting a fine particle metal such as Pt, the CNT rope can be used as an electrode material for the fuel cell of a direct methanol type, for example. The energy density of the fuel cell can be improved in this case.

The following describes an exemplary method of supporting Pt on CNT ropes. First, an aqueous solution of platinic acid ($H_2PtCl_6$) is supplemented with $H_2O_2$ and $NaHSO_3$ to prepare a Pt colloid. The CNT ropes are then soaked one by one in the Pt colloid, and are heated for 5 to 7 hours at 300° C. to remove Cl. The resulting CNT ropes are obtained as Pt carriers.

Other than the gas filter, the metal carrier of the CNT rope or CNT sheet is can also be used as a molecular filter, a liquid filter, a noise-insulating filter, or a polarizing filter. The metal carrier of the CNT rope or CNT sheet is also applicable to various types of absorbent such as a gas absorbent.

The metal carrier of the CNT rope or CNT sheet can also be used as an electrode. The electrode can be used as a fuel cell, a secondary battery, or a super capacitor, for example. Since metal is supported on each individual CNT rope with a large surface area, the amount of metal supported on the CNT rope can be controlled. Further, in producing the electrode material, metal can be supported more densely and more uniformly in the electrode material by controlling intervals of the CNT ropes. Further, design control of the electrode material is possible by controlling the rope diameter with different combinations of the CNT ropes. This reduces the amount of supported metal, which enables the capacitors to be designed with high energy density.

The electrode can be obtained by arranging the metal-supported CNT ropes on a PTFE (polytetrafluoroethylene) film, for example.

(Surface Modifier)

The surface of the aggregate may be modified to form a surface-modified yarn- or sheet-like material. As used herein, "modifying the surface" means binding an organic functional array or attaching (applying) a functional thin film on a surface of the CNT rope or CNT sheet. This renders the CNT rope or CNT sheet additional functionality.

Specifically, by chemically binding, for example, functional arrays, fullerene, or CNTs between the CNT ropes or CNT sheets, a yarn- or sheet-like material can be produced that excels in strength, electrical conductivity, heat conductivity, or other functionalities.

Examples of functional arrays include a nitro array (—NO2), a sulfone array (—SO3H), a carboxyl array (—COOH), a carbonyl array (>C=O), an ether array (C—O—C), and a phenolic hydroxy array (—OH). By suitably combining CNT ropes or CNT sheets that have incorporated any of such functional arrays, the CNT ropes or CNT sheets can be used as an ion-exchange film, for example.

Further, for example, fullerene is known to undergo polymerization under plasma, light, electron beam, X-rays, or heat. Thus, by polymerizing the fullerene that has been incorporated between CNTs of the CNT ropes or CNT sheets, the functionality of the CNT ropes or CNT sheets can be improved.

Further, such yarn- or sheet-like material may be combined (plied) into a string or a sheet structure. Specifically, by plying the yarn-like material by chemical bonding, the strength and diameter can be increased.

(Plied-Yarn Structure, Fabric Structure, Coiled Structure)

CNT ropes or CNT sheets of the present invention can be plied together to form a plied-yarn structure. This can be done by twisting around the CNT ropes or CNT sheets. A resulting plied-yarn structure is very strong and lightweight. The strength of the plied-yarn structure can be improved further by using the surface-modified CNT ropes or CNT sheets. The plied-yarn structure may be provided as a string or a rope, for example.

The plied-yarn structure can be plied further to fabricate a fabric structure. Such a fabric structure can alternatively be fabricated by impregnating the CNT ropes or CNT sheets with liquid resin or a resin solution and plying them together. The fabric structure, then, is a fabric-like or skin-like structure that is fabricated by braiding strings or ropes of CNT ropes or CNT sheets, or CNT ropes or CNT sheets that have been impregnated with resin.

Figure 14:
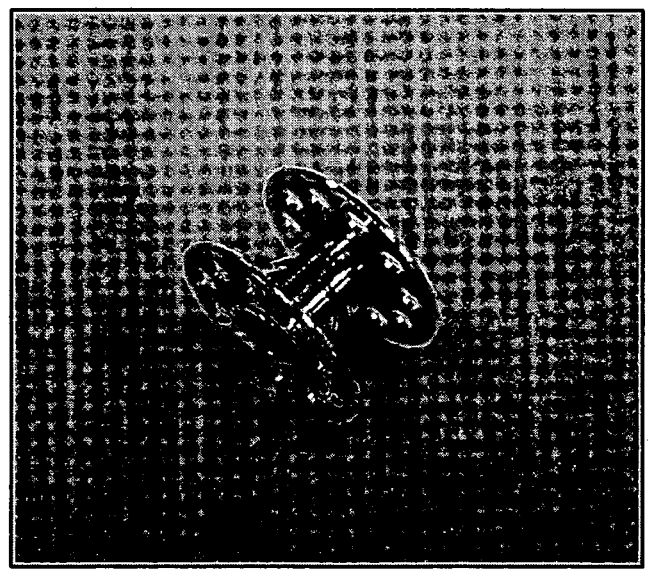
FIG. 14 is a photograph (image) showing a coiled structure with a rolled CNT rope, according to one embodiment of the present invention.

The CNT ropes or CNT sheets can be wound to fabricate a coiled structure. For example, such coiled structure can be fabricated by winding the CNT ropes or CNT sheets with a Bobbin®, as shown in FIG. 14.

(Reinforcing Material)

A CNT rope or CNT sheet of the present invention can be used as a sheet-like or rope-like reinforcing material for carbon, FRP (Fiber Reinforced Plastics), FRM (Fiber Reinforced Metels), FRC (Fiber Reinforced Ceramics), C/C (Carbon/Carbon) composite, optical fibers, or tires, for example. A CNT rope or CNT sheet of the present invention can also be used as a reinforcing material or composite material for ceramics or metals, for example.

(Electrical Wires, Conducting Wires)

Common electrical wires are produced by plying copper lines into a thick wire. Conventionally, it has been difficult to fabricate long CNTs or long plies of CNTs. In the present invention, the CNT ropes are plied together, and therefore the length and thickness of the CNT rope can be controlled. A CNT rope or CNT sheet of the present invention therefore has potential applications as an electrical wire or a conducting wire.

The CNT has a smaller resistance than copper. The CNT rope and CNT sheet are therefore suitable as an electrical wire or conducting wire for high-resistant current. The CNT rope and CNT sheet have a greater current density (current density per unit area) than copper. To take multi-walled CNTs as an example, the maximum current density exceeds that of copper by more than 1000 fold. Therefore, the CNT rope of the present invention is also applicable to LSI wiring. Further, a long conducting wire made out of the CNT rope would be useful when thin wires are required to produce large current as in a large-torque/high-output small motor. Further, since the CNT rope is lighter than conventional metal wires, the weight of the motor can be reduced by replacing the copper wires with the CNT ropes.

Due to the small size, use of CNTs for the wiring of an electrical device is associated with difficulties in handling. However, by providing the CNTs as a unidirectionally aligned aggregate as in the present invention, the CNTs can more easily be used as wirings. Such CNTs can also be provided by being wound around a Bobbin®, for example.

It is generally believed that the upper limit of L/S of common thin lines currently in use is 10 microns. However, with the directional CNT rope or CNT sheet, a controllable range can be increased and nano-order thin lines can be produced.

(Sensors)

A CNT rope and CNT sheet of the present invention can be used as a sensor. The sensor may be a flow-rate sensor, a pressure sensor, or a gas sensor, for example. The flow-rate sensor detects a flow rate by detecting the amount of heat absorbed by the gas at a sensor unit. The size of the flow-rate sensor can be reduced by using the CNT rope or CNT sheet for the sensor unit. In this way, power consumption can be reduced. Further, a flow-rate sensor can be produced that can detect even a trace flow rate.

A Pirani vacuum gauge is used a pressure sensor. In this particular type of pressure sensor, changes in temperature of a filament due to heat energy, which the gas molecules have taken away when they reflected off the metal wires, are detected as changes in resistance. In the Pirani vacuum sensor, the size and weight of the sensor can also be reduced by using the CNT ropes or CNT sheets for the metal wires. Power consumption can be reduced as well. Further, with the CNT ropes or CNT sheets, the diameter of the filament can be reduced. This increases the measurable pressure range, and thereby enables fabrication of a wide-range vacuum gauge.

It is ideal that single-walled CNTs be used for the sensor unit of the gas sensor. However, CNT ropes or CNT sheets of CNTs with a small number of layers can be used for the sensor unit. The CNTs are covered with $\pi$ electrons on sides. As such, polar gas molecules draw $\pi$ electrons when they are absorbed by the CNTs. As a result, the electrical resistance of the CNT ropes or CNT sheets varies. The electrical resistance varies differently for different polarities of the gas molecules, thereby allowing for detection of different molecular species. Further, by modifying the surfaces of CNTs with specific chemical molecules, it may be possible to selectively detect different molecular species. The CNT rope and CNT sheet therefore have a potential use as a probe (detector).

(Transparent Electrodes)

A CNT rope and CNT sheet of the present invention are superior to conventional CNTs in terms of alignment and dispersibility, and are therefore usable as a transparent material. For example, a CNT rope or CNT sheet with CNTs of controlled density may be installed in a structure to provide a transparent conductor. The transmittance or conductivity of the structure can be controlled according to the density of the CNTs. Further, the CNT ropes or CNT sheets may be installed in different directions and stacked together to fabricate a device. The structure may be made of any material, including rubber and resin.

(Blades)

A CNT rope and CNT sheet of the present invention can be used as a blade by taking advantage of high strength and nano-order sharpness.

(Small Motor, Small Electromagnet)

As described above, a CNT rope or CNT sheet of the present invention can be used to fabricate conducting wires. The conducting wires can be used to make a coil, which can then be used to fabricate a motor or an electromagnet. The strength of magnetic field (related to the magnitude of torque in a motor) in a motor or an electromagnet is proportional to the number of turns or the magnitude of current in the coil. Thus, if an electromagnet with a strong electric field were fabricated using copper wires, the size and weight of the electromagnet would be increased by the thickness and weight of the copper wires. The size and weight of a motor or an electromagnet can be reduced greatly by using the CNT rope or CNT sheet, which is thin, lightweight, and capable of flowing large current.

(Film, Transparent Electromagnetic Wave Absorber, Building Material, Building Material, Diaphragm, Sliding Member, Artificial Muscle, Clothes)

A CNT rope or CNT sheet of the present invention can be processed to fabricate a thin film. The film can be used as a transparent electromagnetic absorber. Further, a CNT rope and CNT sheet of the present invention are very strong, and have a specific gravity that is smaller than that of iron by about 10 fold. This makes the CNT rope and CNT sheet suitable for building materials. If the strength could be increased further, it would be possible to use the CNT rope and CNT sheet as a material of a space elevator and the like.

Further, a CNT rope and CNT sheet of the present invention can be used as a diaphragm. For example, by oscillating the CNTs, the CNT rope or CNT sheet can be used as a speaker. Further, by taking advantage of superior alignment and ease of bundling, the CNT rope and CNT sheet of the present invention can be used as a sliding member for Pantograph® of Shinkansen®.

Further, with a powder of CNT applied over a double-sided tape and with electrodes attached on the both sides of the tape, placing the tape in a saline solution and applying voltage causes the tape to bend. By taking advantage of such property, the CNT rope or CNT sheet can be used as an artificial muscle of a nano-order diameter, by bonding two CNT ropes together with a resin or other insulating layers in between. Further, such property can be exploited to realize a piezoelectric element.

Further, the CNT rope or CNT sheet can be used as a material of clothes. When used for this purpose, the CNT rope or CNT sheet provides protection against electromagnetic wave or static electricity.

(Fishing Line, Photo-Absorber, Reflector, Nonwoven Fabric, Artificial Dielectric Medium, Ink, Coatings, Heat-Resistant Material, Abrasion-Resistant Material)

Other than the foregoing examples, a CNT rope and CNT sheet of the present invention can be used as fishing lines, photo-absorbers, reflectors, nonwoven fabrics, artificial dielectric Media, ink, coatings, heat-resistant materials, or abrasion-resistant materials. By taking advantage of superior alignment and dispersibility, the CNT rope and CNT sheet can be used as a polarizing material. Thus, other than polarizing filters, the CNT rope and CNT sheet can be used as photo-absorbers or the like.

When used as nonwoven fabrics, the thickness of the fabric can be reduced. When used as ink, conductive ink can be realized. When used as coatings, the strength of the coating itself can be increased.

As described above, the present invention provides an aggregate of carbon-based microstructures, which includes a plurality of carbon-based microstructures that are assembled together, wherein the carbon-based microstructures are aligned in one direction, and are assembled together along the direction of alignment.

In the aggregate of carbon-based microstructures, it is preferable that the carbon-based microstructures be assembled together in a direction orthogonal to the direction of alignment. By assembling the carbon-based microstructures in a direction orthogonal to the direction of alignment, the aggregate can have a two-dimensional spread. This further improves ease of handling and workability.

In the aggregate of carbon-based microstructures, it is preferable that the carbon-based microstructures be bonded together by van der Waals forces. Further, in the aggregate of carbon-based microstructures, it is preferable that the carbon-based microstructures be physically or chemically bonded together. This makes it easier to assemble the carbon-based microstructures, and thereby improves the strength of the aggregate.

In the aggregate of carbon-based microstructures, it is preferable that the carbon-based microstructures include no greater than 10 bends per 1 μm length extending in the direction of alignment. This improves crystallinity of the carbon-based microstructures. As a result, the aggregate can be made longer and the strength of the aggregate can be improved. As used herein, a "bend" refers to a portion where the carbon-based microstructures are bent from the direction of alignment. For example, a portion with a disordered crystal structure (known as defects) constitutes a bend.

In the aggregate of carbon-based microstructures, it is preferable that the carbon-based microstructures be carbon nanotubes. Further, in the aggregate of carbon-based microstructures, it is preferable that metal be supported on the carbon-based microstructures, and that the carbon-based microstructures be surface-modified. This renders the carbon-based microstructures a wide variety of additional functionalities, allowing the carbon-based microstructures to be used for many different applications.

For example, the aggregate of carbon-based microstructures can be used for a reinforcing material, an electrical wire, a conducting wire, a sensor, a transparent conductor, a blade, a motor, a building material, a diaphragm, a sliding member, an artificial muscle, clothes, a fishing line, a photo-absorber, a reflector, a nonwoven fabric, an artificial dielectric medium, ink, coatings, a heat-resistant material, or an abrasion-resistant material.

The carbon-based microstructures can also be used as a plied yarn-structure realized by a ply of aggregates of carbon-based microstructures; a fabric structure realized by a resin-impregnated ply of aggregates of carbon-based microstructures; or a coiled structure realized by a roll of an aggregate of carbon-based microstructures.

The aggregate of carbon-based microstructures can also be used as a resin sheet realized by an aggregate of carbon-based microstructures. A laminate can be obtained by stacking at least one resin sheet. The resin sheet or laminate can be used as a high-temperature conducting sheet. The aggregate can also be used as a film realized by an aggregate of carbon-based microstructures. The film can be used as a transparent electromagnetic wave absorber.

As described above, the present invention provides an array of carbon-based microstructures, which includes carbon-based microstructures that are provided on a substrate by being aligned substantially perpendicular to the substrate, wherein the carbon-based microstructures are provided on the substrate at a density of no less than $1 \times 10^{11}/cm^2$.

In the array of carbon-based microstructures, it is preferable that the carbon-based microstructures include no greater than 10 bends per 1 μm length extending in the direction of alignment. This improves crystallinity of carbon-based microstructures making up the array.

The present invention provides a fabrication method of an aggregate of carbon-based microstructures. The method includes the steps of: forming a plurality of carbon-based microstructures on a substrate with a direction of alignment perpendicular to the substrate; and pulling at least one of the carbon-based microstructures.

Preferably, the fabrication method further includes the step of splitting the substrate, before the pulling step. This makes it easier to form the aggregate. It is preferable that the forming step be performed by supplying the substrate with a source gas for forming the carbon-based microstructures, and a carrier gas for carrying the source gas, and that a proportion of concentration of the source gas with respect to a total concentration of the all gases is no less than 23%. In this way, density of the carbon-based microstructures formed on the substrate can be increased. This further improves ease of bundling and the strength of the aggregate.

Preferably the fabrication method further includes the step of physically or chemically bonding the carbon-based microstructures together. In this way, the carbon-based microstructures can be firmly bonded together, and the strength of the aggregate can be further improved.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. An embodiment based on a proper combination of technical means disclosed in different embodiments is encompassed in the technical scope of the present invention.

INDUSTRIAL APPLICABILITY

As described above, an aggregate of carbon-based microstructures according to the present invention has various properties, including high strength and high current density. Combined with the fact that the aggregate is observable by naked eye, these properties make the aggregate easy to handle and process. An aggregate of carbon-based microstructures is therefore particularly suitable for small and lightweight electrical devices, wirings of such devices, and various types of materials. As such, applicable fields of the present invention are not just limited to industries manufacturing an aggregate of carbon-based microstructures, but the invention can be suitably used in a wide variety of industries, including chemical industry, material processing, resin industry, and industries manufacturing electrical and electronic devices and components, for example.

The invention claimed is:

1. An aggregate of carbon-based microstructures in which carbon nanotubes are assembled together,
wherein the carbon nanotubes are aligned in one direction, and are assembled (i) along the direction of alignment so as to form a rope-like structure having a length of not shorter than 20 cm by bundling filamentous structures, each of which is formed by bundling the carbon nanotubes, and (ii) in a direction orthogonal to the direction of alignment so as to form a sheet-like structure,
the carbon nanotubes are surrounded by an amorphous carbon layer whose thickness is no greater than 10% of a diameter of the carbon nanotubes,
the carbon nanotubes each have a diameter of 10 nm through 20 nm,
the carbon nanotubes are formed by a catalyst chemical vapor deposition method, using gas in which a proportion of concentration of a source gas for forming the carbon nanotubes is no less than 23% of a total concentration, and
the aggregate has a Young's modulus of not less than 0.8 TPa.

2. An aggregate of carbon-based microstructures as set forth in claim 1, wherein the carbon nanotubes include no greater than 10 bends per 1 µm length extending in the direction of alignment.

3. A resin sheet that comprises an aggregate of carbon-based microstructures set forth in claim 1.

4. A laminate that comprises one or more of the resin sheet set forth in claim 3.

5. A high-temperature conducting sheet which comprises the laminate of claim 4.

6. A high-temperature conducting sheet which comprises the resin sheet of claim 3.

7. A film which comprises an aggregate of carbon-based microstructures set forth in claim 1.

8. A film as set forth in claim 7, which is used as a transparent electromagnetic wave absorber.

9. An aggregate of carbon-based microstructures as set forth in claim 1, wherein the carbon nanotubes are assembled (i) along the direction of alignment so as to form a rope-like structure having a length of not shorter than 50 cm, and (ii) in the direction orthogonal to the direction of alignment so as to form the sheet-like structure.

10. An aggregate of carbon-based microstructures as set forth in claim 1, wherein the carbon nanotubes are formed by a catalyst chemical vapor deposition method, using gas in which a proportion of concentration of a source gas for forming the carbon nanotubes is no less than 28% of a total concentration.

11. An aggregate of carbon-based microstructures as set forth in claim 1, wherein the carbon nanotubes are formed by a catalyst chemical vapor deposition method, using gas in which a proportion of concentration of a source gas for forming the carbon nanotubes is no less than 70% of a total concentration.

12. An aggregate of carbon-based microstructures as set forth in claim 1, which is produced with a source gas, which is supplied only for a certain time period, and with a carrier gas, solely supplied for other times, for carrying the source gas.

13. An aggregate of carbon-based microstructures in which carbon nanotubes are assembled together,
wherein the carbon nanotubes are aligned in one direction and are assembled together along the direction of alignment so as to form a rope-like structure having a length of not shorter than 20 cm by bundling filamentous structures, each of which is formed by bundling the carbon nanotubes,
the carbon nanotubes are surrounded by an amorphous carbon layer whose thickness is no greater than 10% of a diameter of the carbon nanotubes,
the carbon nanotubes each have a diameter of 10 nm through 20 nm,
the carbon nanotubes are formed by a catalyst chemical vapor deposition method, using gas in which a proportion of concentration of a source gas for forming the carbon nanotubes is no less than 23% of a total concentration, and
the aggregate has a Young's modulus of not less than 0.8 TPa.

14. An aggregate of carbon-based microstructures as set forth in claim 13, wherein the carbon nanotubes are assembled along the direction of alignment so as to form a rope-like structure having a length of not shorter than 50 cm.

15. An aggregate of carbon-based microstructures as set forth in claim 13, wherein the carbon nanotubes include no greater than 10 bends per 1 µm length extending in the direction of alignment.

16. A resin sheet that comprises an aggregate of carbon-based microstructures set forth in claim 13.

17. A film which comprises an aggregate of carbon-based microstructures set forth in claim 13.

18. A plied yarn-structure which comprises a ply of a plurality of aggregates set forth in claim 13.

19. A fabric structure which comprises a resin-impregnated ply of a plurality of aggregates set forth in claim 13.

20. An aggregate of carbon-based microstructures as set forth in claim 13, wherein the carbon nanotubes are formed by a catalyst chemical vapor deposition method, using gas in which a proportion of concentration of a source gas for forming the carbon nanotubes is no less than 28% of a total concentration.

21. An aggregate of carbon-based microstructures as set forth in claim 13, wherein the carbon nanotubes are formed by a catalyst chemical vapor deposition method, using gas in which a proportion of concentration of a source gas for forming the carbon nanotubes is no less than 70% of a total concentration.

22. An aggregate of carbon-based microstructures as set forth in claim 13, which is produced with a source gas, which is supplied only for a certain time period, and with a carrier gas, solely supplied for other times, for carrying the source gas.

* * * * *